(12) United States Patent
Kogami

(10) Patent No.: US 12,556,652 B2
(45) Date of Patent: Feb. 17, 2026

(54) COMMUNICATION SUPPORT SYSTEM, COMMUNICATION SUPPORT APPARATUS, COMMUNICATION SUPPORT METHOD, AND STORAGE MEDIUM

(71) Applicant: Kazuhiko Kogami, Kanagawa (JP)

(72) Inventor: Kazuhiko Kogami, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 218 days.

(21) Appl. No.: 18/500,414

(22) Filed: Nov. 2, 2023

(65) Prior Publication Data

US 2024/0171704 A1 May 23, 2024

(30) Foreign Application Priority Data

Nov. 18, 2022 (JP) ................................ 2022-184790
Sep. 29, 2023 (JP) ................................ 2023-169357

(51) Int. Cl.
*H04N 7/14* (2006.01)
*G10L 15/08* (2006.01)
*G10L 15/26* (2006.01)
*G10L 25/63* (2013.01)

(52) U.S. Cl.
CPC ............. *H04N 7/147* (2013.01); *G10L 15/08* (2013.01); *G10L 15/26* (2013.01); *G10L 25/63* (2013.01)

(58) Field of Classification Search
None
See application file for complete search history.

(56) References Cited

U.S. PATENT DOCUMENTS

| | | | | |
|---|---|---|---|---|
| 7,877,255 | B2 * | 1/2011 | Zlokarnik | G10L 15/065 381/94.1 |
| 11,057,233 | B1 * | 7/2021 | D'Aniello | H04L 65/1046 |
| 2007/0071206 | A1 * | 3/2007 | Gainsboro | H04M 3/42221 379/168 |
| 2015/0358583 | A1 * | 12/2015 | Lee | H04L 12/1822 348/14.08 |
| 2019/0287531 | A1 | 9/2019 | Tsukada | |
| 2020/0160278 | A1 * | 5/2020 | Allen | G06Q 10/1095 |
| 2020/0202389 | A1 * | 6/2020 | Pulido | G06Q 30/0269 |
| 2022/0261201 | A1 * | 8/2022 | Sasaki | G10L 25/63 |
| 2023/0275775 | A1 * | 8/2023 | Brickner | G06F 40/279 386/241 |

FOREIGN PATENT DOCUMENTS

JP 2011-210133 A 10/2011
JP 2019-164232 A 9/2019

* cited by examiner

*Primary Examiner* — Duc Nguyen
*Assistant Examiner* — Assad Mohammed
(74) *Attorney, Agent, or Firm* — IPUSA, PLLC

(57) ABSTRACT

A communication support system includes processing circuitry. The processing circuitry acquires a speech sound of a participant participating or having participated in a communication and a speech sound of the other participant participating or having participated in the communication. The processing circuitry displays, on a display screen, an index indicating a speech state of the participant and an index indicating a speech state of the other participant in time series. The processing circuitry outputs speech content of a selected portion of the index indicating the speech state of the participant or the index indicating the speech state of the other participant.

14 Claims, 26 Drawing Sheets

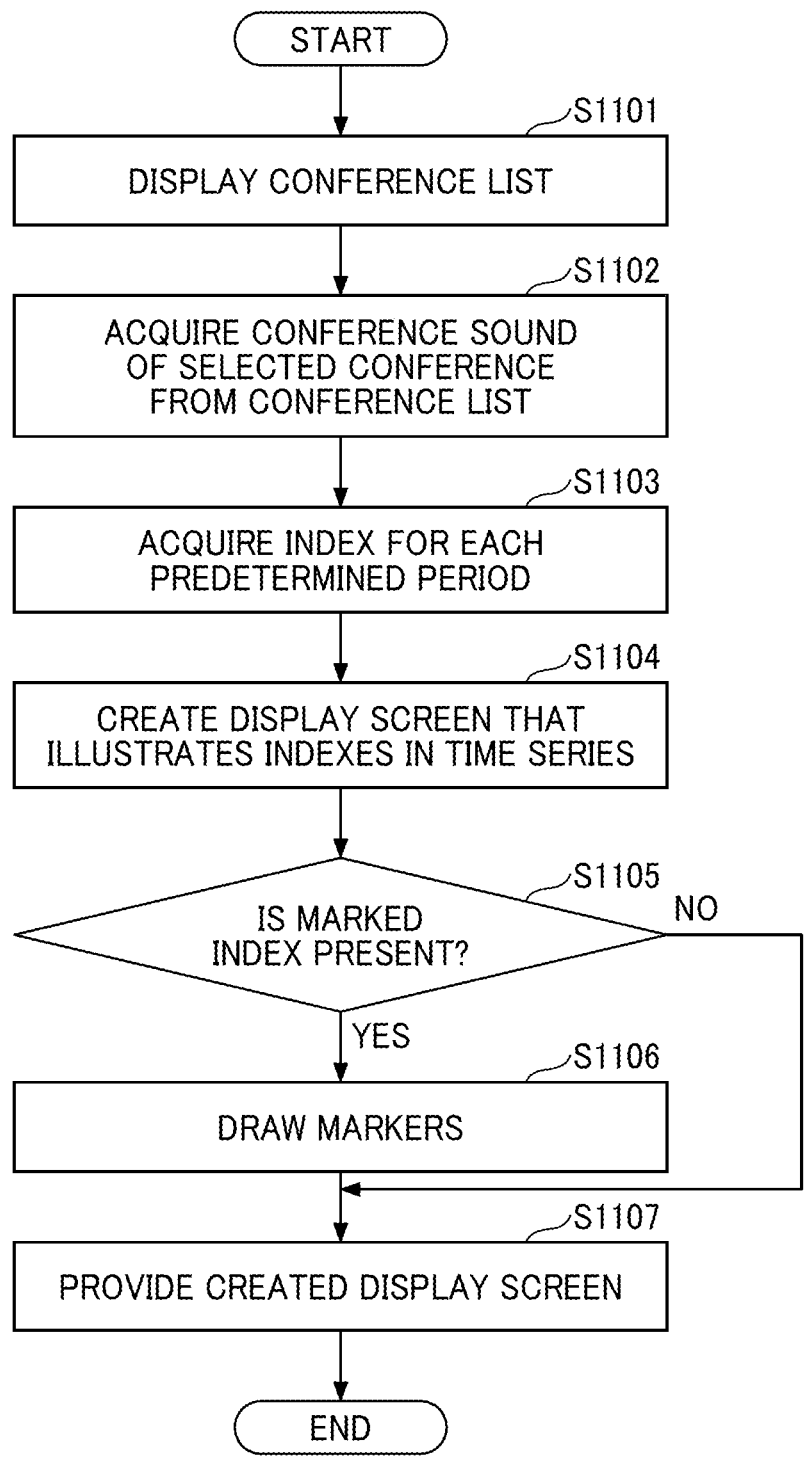

FIG. 12

MANAGER A

CONFERENCE LIST ⌒1201

| DATE | TITLE | CLIENT | PERSON IN CHARGE | REVIEW (1202) | MARKER (1203) |
|---|---|---|---|---|---|
| 2022.5.11 | MEETING FOR DASHBOARD RENOVATION | CUSTOMER X | MR. A | ★★★★☆ | ● 1204 |
| 2022.5.11 | MEETING FOR REPLACEMENT OF MFP | CUSTOMER N | MR. B | ★★★★☆ | ● |
| 2022.5.11 | CONSULTATION ON ADVERTISEMENT OPERATION | CUSTOMER X | MR. C | ★★★★☆ | ● |
| 2022.5.11 | 3D PRINTER PURCHASE CONSULTATION | CUSTOMER O | MR. D | ★★★★☆ | |
| 2022.5.11 | HOLDING WEBINAR | CUSTOMER P | MR. E | ★★★★☆ | |
| 2022.5.11 | MEETING FOR REPLACEMENT OF MFP | CUSTOMER Q | MR. F | ★★★★☆ | ● |
| 2022.5.11 | MEETING FOR DASHBOARD RENOVATION | CUSTOMER R | MR. G | ★★★★☆ | |
| 2022.5.11 | CONSULTATION ON ADVERTISEMENT OPERATION | CUSTOMER S | MR. H | ★★★★☆ | |
| 2022.5.11 | MEETING FOR DASHBOARD RENOVATION | CUSTOMER T | MR. I | ★★★★☆ | ● |
| 2022.5.11 | MEETING FOR DASHBOARD RENOVATION | CUSTOMER T | MR. I | ★★★★☆ | ● |
| 2022.5.11 | MEETING FOR DASHBOARD RENOVATION | CUSTOMER R | MR. G | ★★★★☆ | |
| 2022.5.11 | HOLDING WEBINAR | CUSTOMER P | MR. E | ★★★★☆ | |

⌒1200

COMMUNICATION SUPPORT SYSTEM, COMMUNICATION SUPPORT APPARATUS, COMMUNICATION SUPPORT METHOD, AND STORAGE MEDIUM

CROSS-REFERENCE TO RELATED APPLICATIONS

This patent application is based on and claims priority pursuant to 35 U.S.C. § 119(a) to Japanese Patent Application No. 2022-184790, filed on Nov. 18, 2022, and No. 2023-169357, filed on Sep. 29, 2023, in the Japan Patent Office, the entire disclosure of which is hereby incorporated by reference herein.

BACKGROUND

Technical Field

Embodiments of the present disclosure relate to a communication support system, a communication support apparatus, a communication support method, a storage medium storing program code.

Related Art

Conference systems in which content data such as video or sound is transmitted and received between multiple terminal devices have become widespread. A shared terminal is known that causes a display unit to display information indicating a volume of a sound, information indicating a speed of the sound, and text data generated based on collected sound data.

SUMMARY

Embodiments of the present disclosure described herein provide a novel communication support system including processing circuitry. The processing circuitry acquires a speech sound of a participant participating or having participated in a communication and a speech sound of the other participant participating or having participated in the communication. The processing circuitry displays, on a display screen, an index indicating a speech state of the participant and an index indicating a speech state of the other participant in time series. The processing circuitry outputs speech content of a selected portion of the index indicating the speech state of the participant or the index indicating the speech state of the other participant.

Embodiments of the present disclosure described herein provide a novel communication support apparatus including processing circuitry. The processing circuitry acquires a speech sound of a participant participating or having participated in a communication and a speech sound of the other participant participating or having participated in the communication. The processing circuitry displays, on a display screen, an index indicating a speech state of the participant and an index indicating a speech state of the other participant in time series. The processing circuitry outputs speech content of a selected portion of the index indicating the speech state of the participant or the index indicating the speech state of the other participant.

Embodiments of the present disclosure described herein provide a novel communication support method. The method includes: acquiring a speech sound of a participant participating or having participated in a communication and a speech sound of the other participant participating or having participated in the communication; displaying, on a display screen, an index indicating a speech state of the participant and an index indicating a speech state of the other participant in time series; and outputting speech content of a selected portion of the index indicating the speech state of the participant or the index indicating the speech state of the other participant.

BRIEF DESCRIPTION OF THE DRAWINGS

A more complete appreciation of embodiments of the present disclosure and many of the attendant advantages and features thereof can be readily obtained and understood from the following detailed description with reference to the accompanying drawings, wherein:

FIG. 11 is a flowchart of display screen providing processing according to the first embodiment of the present disclosure;

FIG. 12 is a diagram illustrating a display screen displaying a conference list according to the first embodiment of the present disclosure;

Figure 1:
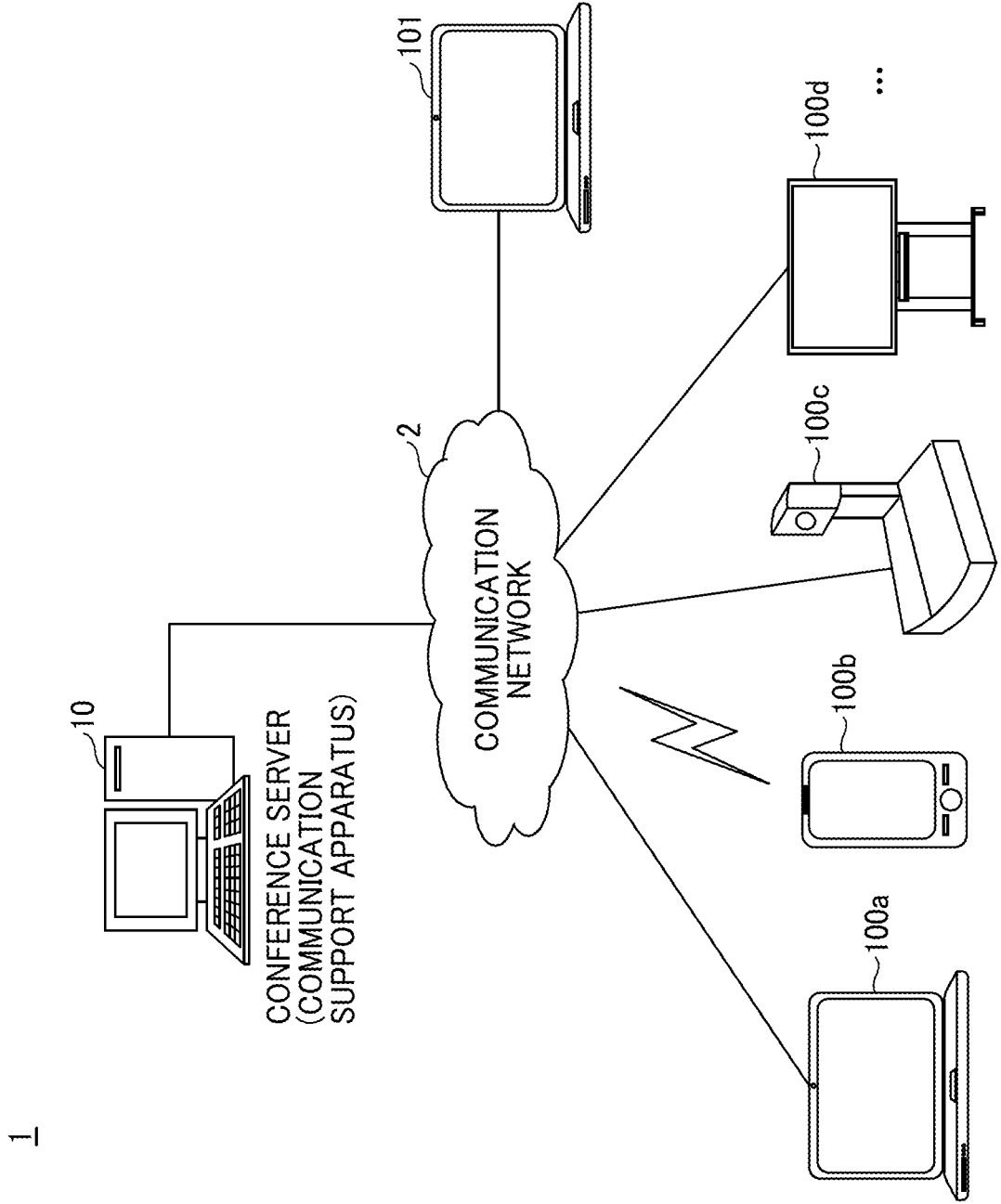
FIG. 1 is a diagram illustrating a system configuration of a communication support system according to an embodiment of the present disclosure.

The accompanying drawings are intended to depict embodiments of the present disclosure and should not be interpreted to limit the scope thereof. The accompanying drawings are not to be considered as drawn to scale unless explicitly noted. Also, identical or similar reference numerals designate identical or similar components throughout the several views.

DETAILED DESCRIPTION

In describing embodiments illustrated in the drawings, specific terminology is employed for the sake of clarity. However, the disclosure of this specification is not intended to be limited to the specific terminology so selected and it is to be understood that each specific element includes all technical equivalents that have a similar function, operate in a similar manner, and achieve a similar result.

Referring now to the drawings, embodiments of the present disclosure are described below. As used herein, the singular forms "a," "an," and "the" are intended to include the plural forms as well, unless the context clearly indicates otherwise.

A description is given below of several embodiments of the present disclosure with reference to the drawings.

Figure 2:
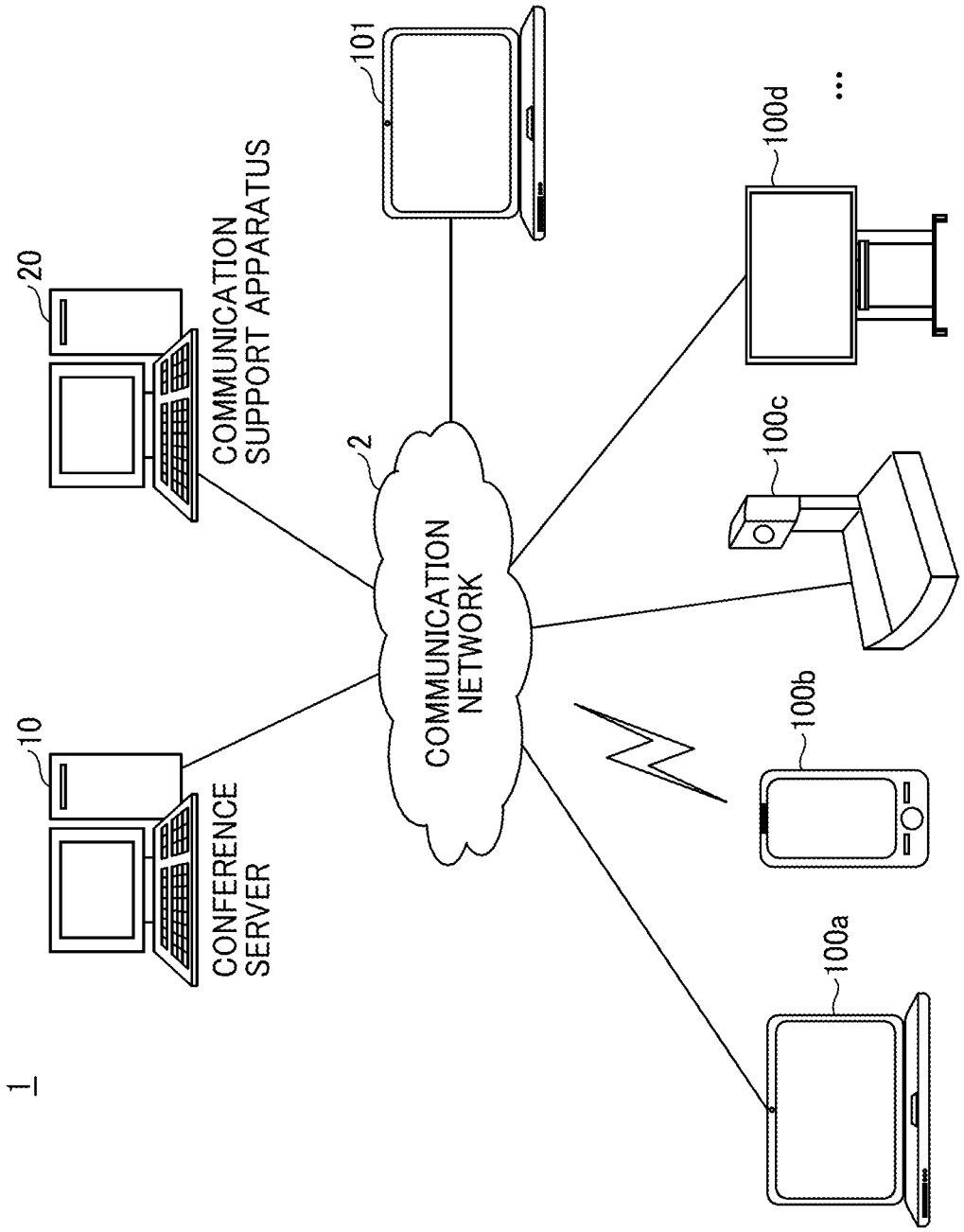
FIG. 2 is a diagram illustrating another system configuration of a communication support system according to an embodiment of the present disclosure.

FIGS. 1 and 2 are diagrams each illustrating system configurations of a communication support system according to an embodiment of the present disclosure. The communication support system 1 includes, for example, a conference server 10, a manager terminal device 101, a terminal device 100a, a terminal device 100b, a terminal device 100c, and a terminal device 100d, each being connected to a communication network 2 such as the Internet or a local area network (LAN). In the following description, any one or more of the multiple terminals including the terminal device 100a, the terminal device 100b, the terminal device 100c, and the terminal device 100d may be referred to as a "terminal device 100" or "terminal devices 100." The number of multiple terminal devices 100 illustrated in FIG. 1 is an example, and the number of multiple terminal devices 100 may be another number of two or more.

The communication support system 1 is a system that supports various communication such as business negotiations, a conference, medical care, a lesson, and counseling in which at least sound is transmitted and received between one terminal device 100 and one or more other terminal devices 100. The "support" of the communication supported by the communication support system 1 includes support for retracing the communication (confirming the content of the performed communication later). In the present embodiment, as an example, a description below is provided on the assumption that the communication support system 1 supports a web conference in which video including sound is transmitted and received between a user of the terminal device 100 and another user of another terminal device 100 to perform the business negotiations.

The terminal device 100 is, for example, a general-purpose information terminal such as a personal computer (PC), a tablet terminal, or a smartphone used by a user who participates in the web conference. Alternatively, the terminal device 100 is an electronic device having a web conference function, such as a video conference device or an interactive white board (IWB). The IWB is a whiteboard that has an electronic blackboard function and performs mutual communication, which is also referred to as an electronic blackboard. In the present embodiment, as an example, a description below is provided on the assumption that the terminal device 100 is a general-purpose information terminal.

The participant who participates in the web conference uses, for example, an application program for the web conference installed in the terminal device 100 or a web browser to access the address for the conference provided by the conference server 10 to participate in the web conference.

The conference server 10 (communication support apparatus) is an information processing apparatus having a configuration of a computer or a system including multiple computers. The conference server 10 provides a web conference service in which sound or video including sound is transmitted and received between multiple terminal devices 100. In FIG. 1, the conference server 10 provides a communication support service according to the present embodiment. In FIG. 1, the conference server 10 serves as a communication support apparatus according to the present embodiment.

The manager terminal device 101 is, for example, an information terminal such as a PC, a tablet terminal, or a smartphone used by a manager who uses the communication support service according to the present embodiment. The manager uses, for example, a web browser installed in the manager terminal device 101 or an application program for the communication support system 1 executed by the manager terminal device 101 to use the communication support service.

The system configuration of the communication support system 1 illustrated in FIG. 1 is an example. For example, as illustrated in FIG. 2, the communication support system 1 may include a communication support apparatus 20 that provides the communication support service according to the present embodiment, separately from the conference server 10 that provides the web conference service.

The communication support service according to the present embodiment may be implemented by, for example, an application program corresponding to the communication support system 1 executed by the manager terminal device 101.

When the business negotiations are conducted using the web conference provided by the conference server 10, a person in charge who has conducted the business negotiations or a manager who manages the person in charge has a request to confirm the content of the business negotiations later. However, it is difficult for the person in charge who has conducted the business negotiations or the manager who manages the person in charge to confirm the content of the business negotiations later.

For example, when the business negotiations take one hour, even if the sound can be played at the double speed, it takes 30 minutes to play back all the sound. Accordingly, for example, it is difficult for a manager who manages multiple persons in charge to play back the sound of the business negotiations conducted by the multiple persons in charge and grasp all content of the business negotiations.

In order to solve such inconvenience, the communication support system 1 according to the present embodiment provides a communication support service that facilitates to confirm the content of the web conference for which business negotiations have been conducted later. For example, the communication support system 1 provides a display screen 300 as illustrated in FIG. 3 or a display screen 400 as illustrated in FIG. 4 to the manager terminal device 101 used by the person in charge or the manager who manages the person in charge.

Figure 3:
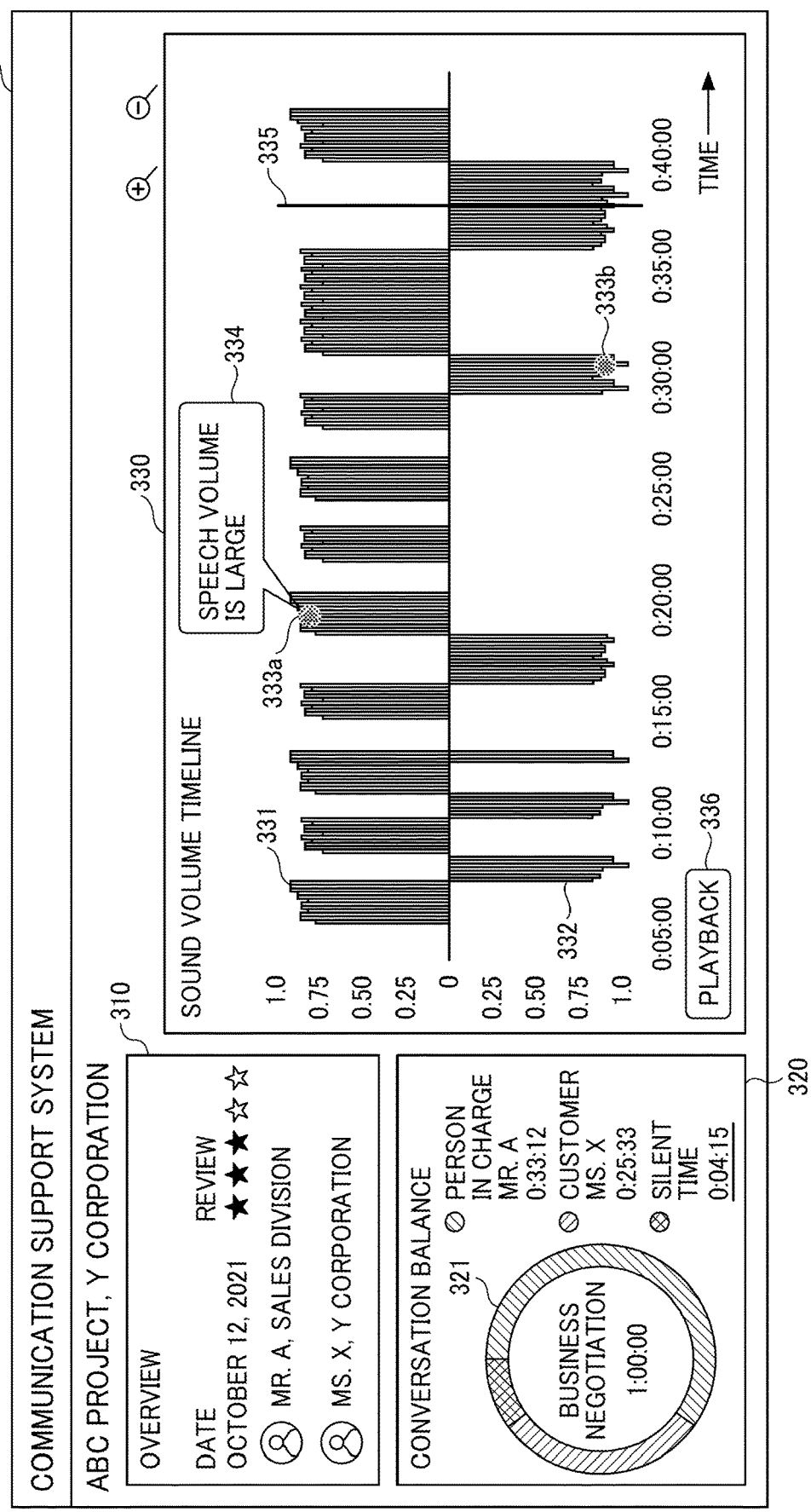
FIG. 3 is a diagram illustrating a display screen according to an embodiment of the present disclosure.
Figure 4:
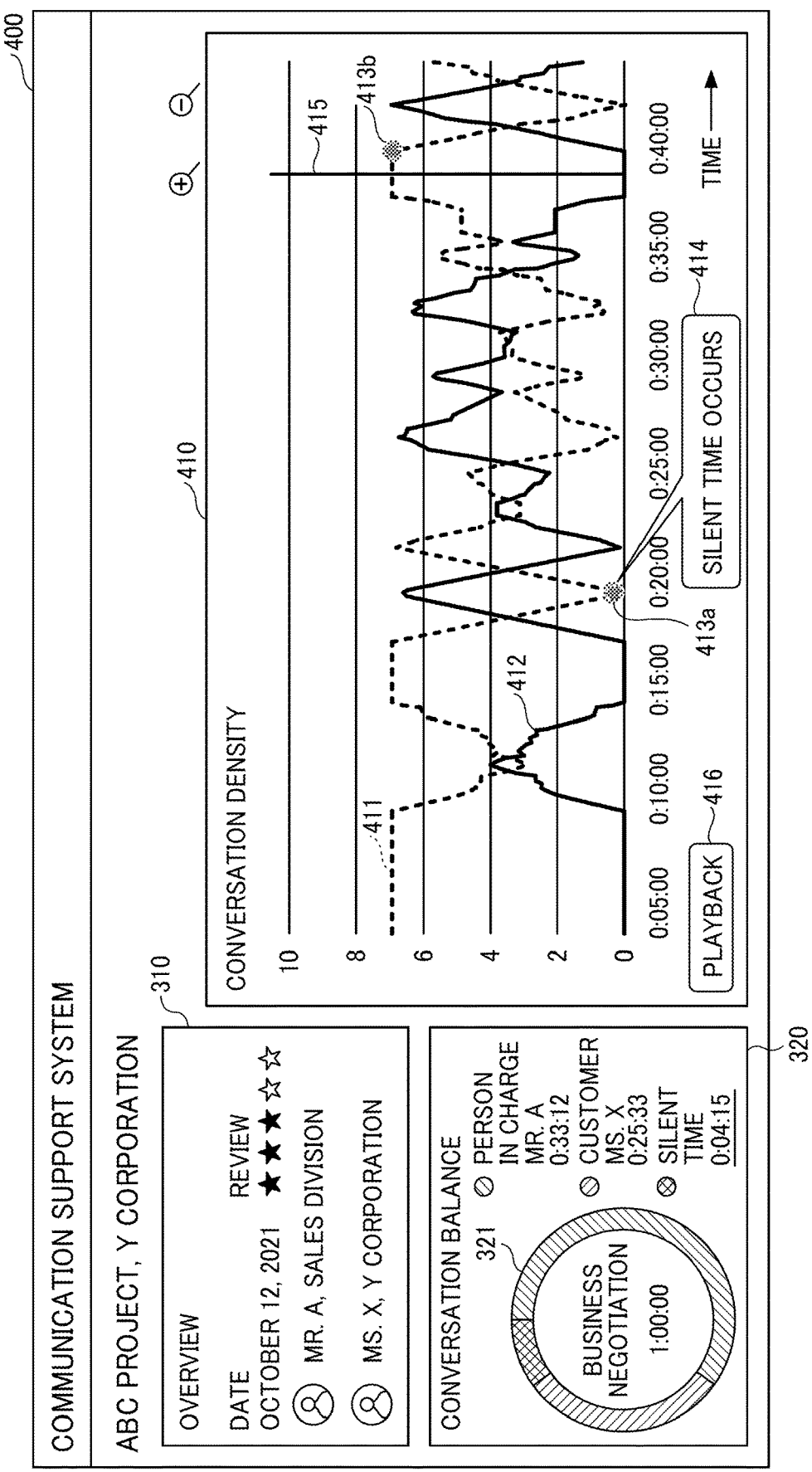
FIG. 4 is a diagram illustrating another display screen according to an embodiment of the present disclosure.

FIG. 3 is a diagram illustrating the display screen 300 according to an embodiment of the present disclosure. In FIG. 3, a conference overview 310, a conversation balance 320, and a sound volume timeline 330 are displayed on the display screen 300 provided by the communication support system 1.

The conference overview 310 displays information such as a name of a participant (person in charge) who has participated in a web conference, a name of another participant (customer) who has participated in the conference, a date and time when the conference has started, and a review. A web conference may be referred to simply as a conference in the following description. The review is, for example, a result of self-review of the negotiations content by the number of stars by the person in charge who has participated in the conference.

The conversation balance 320 serves as an index for visualizing the conference (communication). The conversation balance 320 includes, for example, information such as a time during which a participant has spoken, a time during which another participant has spoken, and a silent time during which the participant and another participant have not spoken in the conference.

Preferably, the communication support system 1 highlights an index that exceeds a threshold value. In FIG. 3, the communication support system 1 underlines to highlight the value of the "silent time" in the conversation balance 320. Preferably, the communication support system 1 displays a graph 321 illustrating a ratio of the three indices in the conversation balance 320.

The sound volume timeline 330 serves as an index for visualizing the conference (communication). In the sound volume timeline 330, for example, a speech sound volume 331 of a participant and a speech sound volume 332 of another participant are illustrated in time series with the horizontal axis as time.

Preferably, the communication support system 1 calculates a moving average for a predetermined period (e.g., about several seconds to ten and several minutes) from the data of a speech sound volume and sets the moving average as the speech sound volume 331 of the person in charge or the speech sound volume 332 of the customer.

Preferably, the communication support system 1 displays markers 333*a* and 333*b* at portions where there is a possibility of a problem in the speech sound volume 331 of the person in charge or the speech sound volume 332 of the customer displayed in time series. The portion where there is a possibility of a problem includes, for example, a portion where the speech sound volume exceeds a predetermined threshold value (the speech sound volume is large or small).

Preferably, the communication support system 1 can display a comment 334 indicating a reason why the markers 333*a* and 333*b* are displayed when a cursor such as a mouse pointer is brought close to the markers 333*a* and 333*b*.

The communication support system 1 has the function to play back a speech sound of a selected portion in the speech sound volume 331 of the participant or the speech sound volume 332 of another participant displayed in time series. In other words, the communication support system 1 plays back the speech sound of the selected portion in the speech sound volume 331 of the participant or the speech sound volume 332 of another participant displayed in time series. For example, when the manager selects the portion around the marker 333*a* of the speech sound volume 331 of the person in charge, the communication support system 1 moves a bar 335 indicating the playback position of the speech sound to the portion around the marker 333*a*. When the manager selects a playback button 336, the communication support system 1 starts playback of the speech sound (speech sound of the participant or speech sound of another participant) from the playback position indicated by the bar 335.

As described above, in the communication support system 1 according to the present embodiment, the manager can find a portion where there is a possibility of a problem in business negotiations in the sound volume timeline 330 displayed on the display screen 300 and can selectively play back a speech sound of the portion where there is a possibility of a problem.

FIG. 4 is a diagram illustrating another display screen according to an embodiment of the present disclosure. In FIG. 4, the conference overview 310, the conversation balance 320, and a conversation density 410 are displayed on the display screen 400 provided by the communication support system 1. The conference overview 310, the conversation balance 320 are the same as the conference overview 310 and the conversation balance 320 described in FIG. 3, and thus description thereof is omitted here.

The conversation density 410 serves as another index for visualizing the conference (communication). In the conversation density 410, for example, a conversation density 411 of the participant (the person in charge) and a conversation density 412 of another participant (the customer) are illustrated in time series with the horizontal axis as time. The conversation density 410 is represented by, for example, the number of spoken characters (or the number of spoken words) within a predetermined time.

Preferably, the communication support system 1 calculates a moving average for a predetermined period (e.g., about several seconds to ten and several minutes) from data of the calculated conversation density and sets the moving average as the conversation density 411 of the participant or the conversation density 412 of another participant.

In FIG. 4, the communication support system 1 activates the display of the conversation density 412 of another participant selected by the manager from the conversation density 411 of the participant and the conversation density 412 of another participant and deactivates the display of the conversation density 411 of the participant.

Preferably, the communication support system 1 displays markers 413*a* and 413*b* at portions where there is a possibility of a problem in the conversation density 411 of the participant or the conversation density 412 of another participant displayed in time series. The portion where there is a possibility of a problem includes, for example, a portion where the conversation density exceeds a predetermined threshold value (the conversation density is equal to or higher than the predetermined or equal to or lower than the predetermined).

Preferably, the communication support system 1 can display a comment 414 indicating a reason why the markers 413*a* and 413*b* are displayed when the cursor such as the mouse pointer is brought close to the markers 413*a* and 413*b*.

The communication support system 1 has the function to play back a speech sound of a selected portion in the conversation density 411 of the participant or the conversation density 412 of another participant displayed in time series. For example, when the manager selects the portion around the marker 413*a* of the conversation density 411 of the participant, the communication support system 1 moves a bar 415 indicating the playback position of the speech sound to the portion around the marker 413*a*. When the manager selects a playback button 416, the communication support system 1 starts playback of the speech sound (speech sound of the person in charge or speech sound of the customer) from the playback position indicated by the bar 415.

As described above, in the communication support system 1 according to the present embodiment, the manager can find a portion where there is a possibility of a problem in business negotiations in the conversation density 410 displayed on the display screen 400 and can selectively play back a speech sound of the portion where there is a possibility of a problem.

The display screens 300 illustrated in FIG. 3 and the display screens 400 illustrated in FIG. 4 are examples of display screens provided by the communication support system 1. For example, the communication support system 1 may provide a display screen that simultaneously displays the sound volume timeline 330 of the display screen 300 and the conversation density 410 of the display screen 400. In this case, the communication support system 1 may display markers at positions where there is a possibility of a problem based on the sound volume timeline 330 and the conversation density 410.

As described above, according to the present embodiment, the communication support system that facilitates to confirm the content of communication later can be provided.

Figure 5:
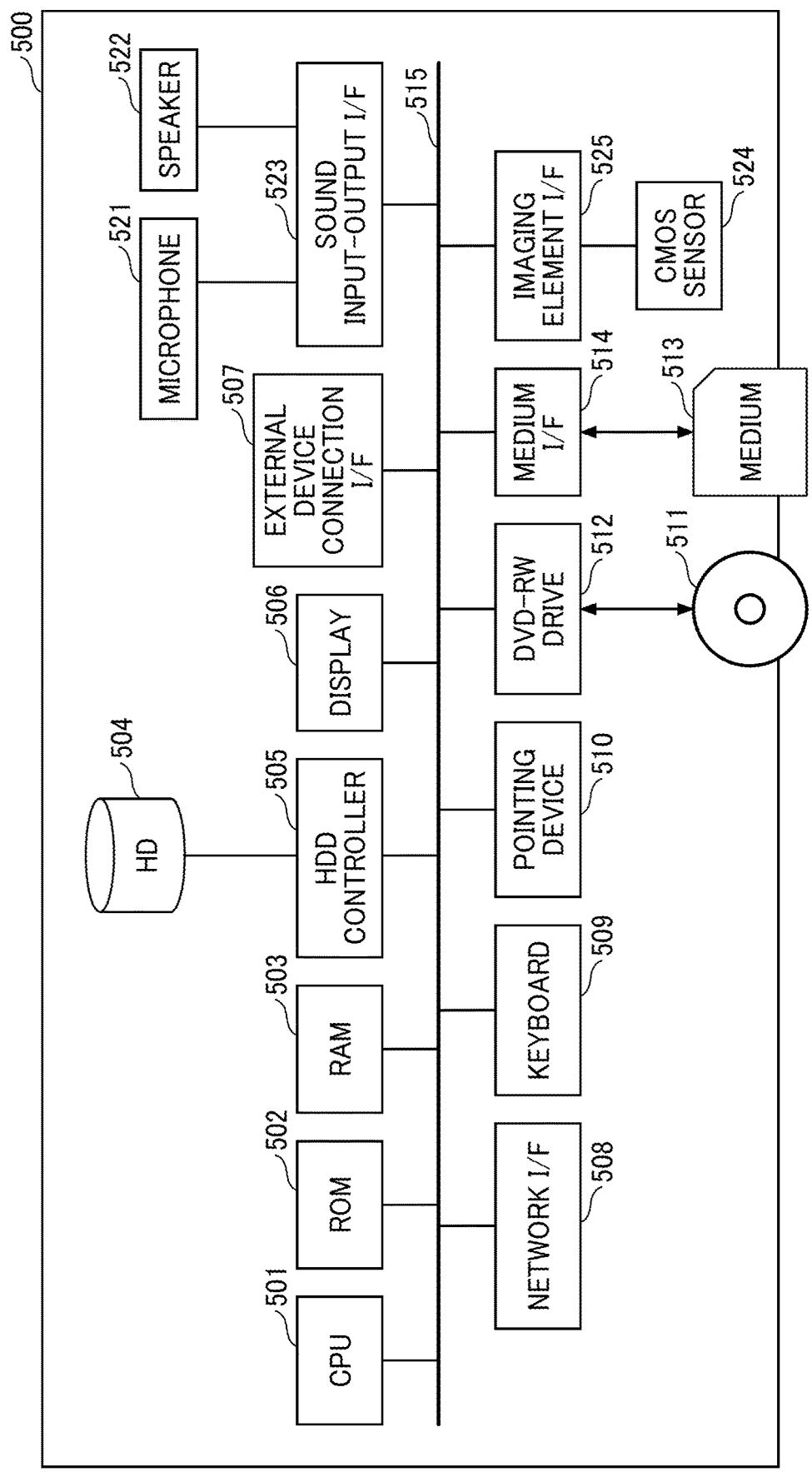
FIG. 5 is a diagram illustrating a hardware configuration of a computer according to an embodiment of the present disclosure.

The conference server 10 and the manager terminal device 101 include, for example, a hardware configuration of a computer 500 illustrated in FIG. 5. The conference server 10 may be implemented by multiple computers 500. The terminal device 100 may include the hardware configuration of the computer 500 illustrated in FIG. 5.

FIG. 5 is a diagram illustrating the hardware configuration of a computer according to an embodiment of the present disclosure. As illustrated in FIG. 5, the computer 500 includes, for example, a central processing unit (CPU) 501, a read-only memory (ROM) 502, a random access memory (RAM) 503, a hard disk drive (HDD) 504, a HDD controller 505, a display 506, an external device connection interface (I/F) 507, a network I/F 508, a keyboard 509, a pointing device 510, a digital versatile disk rewritable (DVD-RW) drive 512, a medium I/F 514, and a bus line 515.

When the computer 500 is the terminal device 100, the computer 500 further includes a microphone 521, a speaker 522, a sound input-output I/F 523, a complementary metal oxide semiconductor (CMOS) sensor 524, and an imaging element I/F 525.

The CPU 501 controls overall operation of the computer 500. The ROM 502 stores programs such as an initial program loader (IPL) to boot the computer 500. The RAM 503 is used as, for example, a work area for the CPU 501. The HDD 504 stores, for example, programs such as an operating system (OS), application programs, and device drivers, and various data. The HDD controller 505 controls, for example, reading or writing of various data to and from the HDD 504 under the control of the CPU 501. The HDD 504 and the HDD controller 505 serves as a storage device.

The display 506 displays, for example, various information such as a cursor, a menu, a window, a character, or an image. The display 506 may be external to the computer 500. The external device connection I/F 507 is an interface for connecting various external devices to the computer 500. The one or more networks I/F 508 are interfaces for connecting the computer 500 to the communication network 2 and communicating with other devices.

The keyboard 509 serves as an input device provided with multiple keys that allow a user to input, for example, characters, numerals, or various instructions. The pointing device 510 serves as an input device that allows the user to, for example, select or execute a specific instruction, select an item to be processed, or move the cursor being displayed. The keyboard 509 and the pointing device 510 may be external to the computer 500.

The DVD-RW drive 512 serves as a removable storage medium to control the reading and writing of various data from and to a DVD-RW 511. The DVD-RW 511 is not limited to the DVD-RW, and other recording media may be used instead of the DVD-RW. The medium I/F 514 controls reading and writing (storing) of data from and to a storage medium 513 such as a flash memory. The bus line 515 includes an address bus, a data bus, and various control signals. The bus line 515 electrically connects the above-described hardware components to each other.

The microphone 521 is a built-in circuit that converts sound into an electrical signal. The speaker 522 is a built-in circuit that generates sound such as music or voice by converting an electrical signal into physical vibration. The sound input-output I/F 523 is a circuit for inputting or outputting a sound signal between the microphone 521 and the speaker 522 under the control of the CPU 501.

The CMOS sensor 524 serves as a built-in imaging unit that captures an object (e.g., a self-portrait photograph) under the control of the CPU 501 to obtain image data. The computer 500 may include an imaging unit such as a charge coupled device (CCD) sensor instead of the CMOS sensor 524. The imaging element I/F 525 is a circuit that controls the driving of the CMOS sensor 524.

Figure 6:
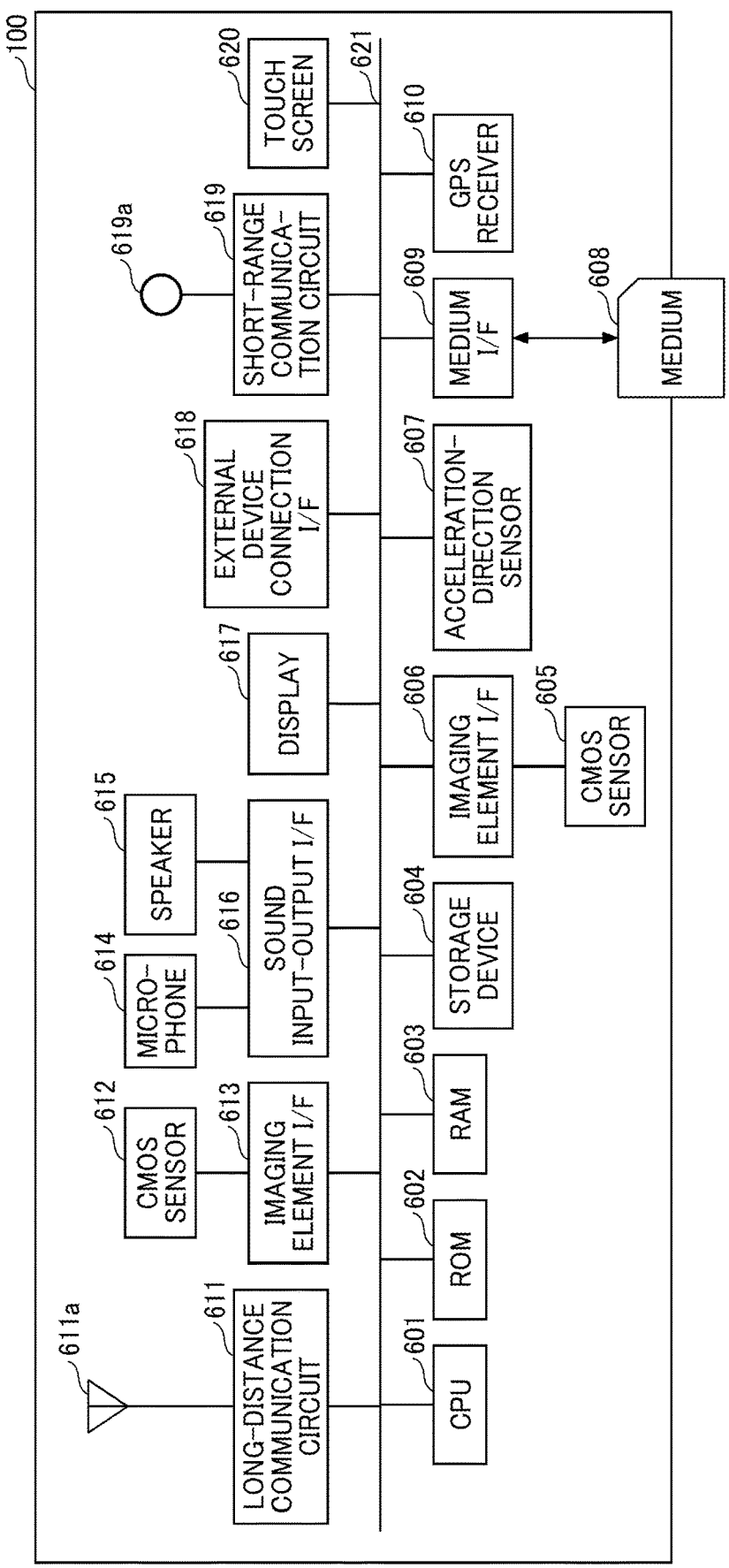
FIG. 6 is a diagram illustrating a hardware configuration of a terminal device according to an embodiment of the present disclosure.

FIG. 6 is a diagram illustrating a hardware configuration of the terminal device 100 according to an embodiment of the present disclosure. The hardware configuration of the terminal device 100 in a case where the terminal device 100 is an information terminal such as a smartphone or a tablet terminal is described below. The terminal device 100 may be, for example, a video conference device or an electronic device having a configuration of a computer such as the IWB and a web conference function. The manager terminal device 101 may have the hardware configuration of the terminal device 100 as illustrated in FIG. 6.

In FIG. 6, the terminal device 100 includes a CPU 601, a ROM 602, and a RAM 603, a storage device 604, a CMOS sensor 605, an imaging element I/F 606, an acceleration-direction sensor 607, a medium I/F 609, and a global positioning system (GPS) receiver 610.

The CPU 601 executes predetermined programs to control the overall operations of the terminal device 100. The ROM 602 stores, for example, programs such as an initial program loader used for booting the terminal device 100. The RAM 603 is used as a work area for the CPU 601. The storage device 604 is a large-capacity storage device that stores the OS, programs such as application programs, and various types of data, and is implemented by, for example, a solid state drive (SSD) or a flash ROM.

The CMOS sensor 605 serves as a built-in imaging unit that captures an object (typically, a self-portrait photograph) under the control of the CPU 601 to obtain image data. The terminal device 100 may include an imaging unit such as a CCD sensor instead of the CMOS sensor 605. The imaging element I/F 606 is a circuit that controls the driving of the CMOS sensor 605. The acceleration-direction sensor 607 includes an electromagnetic compass or gyrocompass for detecting geomagnetism and an acceleration sensor. The medium I/F 609 controls reading and writing (storing) of data from and to a storage medium 608 such as a flash memory (storage medium). The GPS receiver 610 receives a GPS signal (positioning signal) from a GPS satellite.

The terminal device 100 further includes a long-distance communication circuit 611, an antenna 611a for the long-distance communication circuit 611, a CMOS sensor 612, an imaging element I/F 613, a microphone 614, a speaker 615, a sound input-output I/F 616, a display 617, an external device connection I/F 618, a short-range communication circuit 619, an antenna 619a for the short-range communication circuit 619, and a touch panel 620.

The long-distance communication circuit 611 is a circuit that enables the terminal device 100 to communicate with other devices through the communication network 2. The CMOS sensor 612 serves as a built-in imaging unit that captures an object under the control of the CPU 601 to obtain image data. The imaging element I/F 613 is a circuit that controls the driving of the CMOS sensor 612. The microphone 614 is a built-in circuit that converts sound into an electrical signal. The speaker 615 is a built-in circuit that generates sound such as music or voice by converting an electrical signal into physical vibration. The sound input-output I/F 616 is a circuit for inputting or outputting a sound signal between the microphone 614 and the speaker 615 under the control of the CPU 601.

The display 617 serves as a display unit that displays an image of the object and various icons. The display 617 includes a liquid crystal display (LCD) and an organic electroluminescence (EL) display. The external device connection I/F 618 is an interface that connects the terminal device 100 to various external devices. The short-range communication circuit 619 includes a circuit that performs short-range wireless communication. The touch panel 620 is an input device that allows a user to touch a screen of the display 617 to operate the terminal device 100.

The terminal device 100 further includes a bus line 621. The bus line 621 includes an address bus and a data bus, which electrically connects the components illustrated in FIG. 6 such as the CPU 601.

The hardware configuration of the terminal device 100 illustrated in FIG. 6 is an example. The terminal device 100 may have other various hardware configurations as long as the terminal device 100 has a configuration of a computer, a communication circuit, a display, a microphone, and a speaker.

Figure 7:
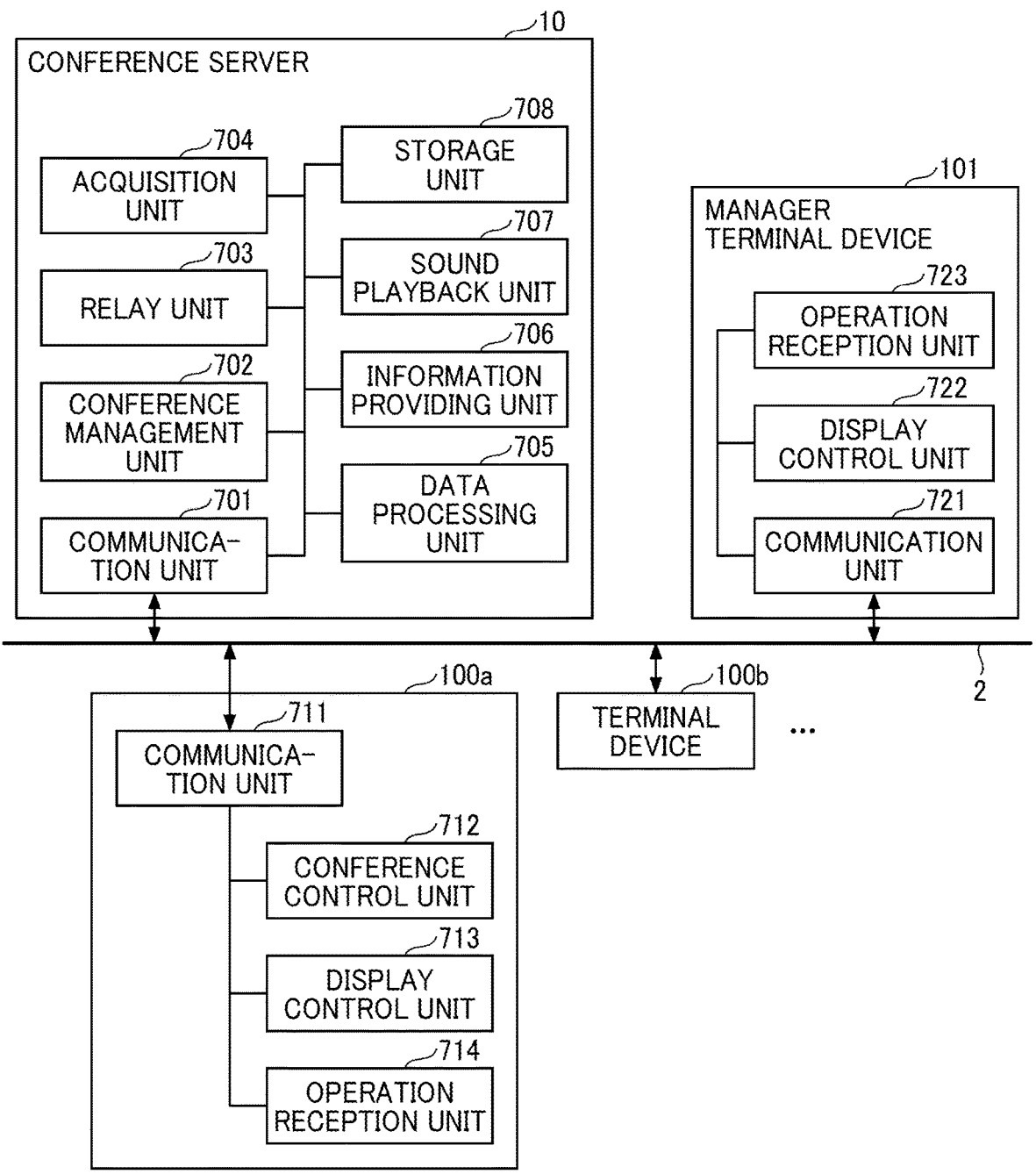
FIG. 7 is a diagram illustrating a functional configuration of a communication support system according to an embodiment of the present disclosure.

A description is given below of a functional configuration of the communication support system 1. FIG. 7 is a diagram illustrating the functional configuration of the communication support system 1 according to an embodiment of the present disclosure. In the following description, it is assumed that the communication support system 1 has a system configuration as illustrated in FIG. 1.

The conference server 10 includes a communication unit 701, a conference management unit 702, a relay unit 703, an acquisition unit 704, a data processing unit 705, an information providing unit 706, and a sound playback unit 707 as the functional configuration, each being implemented by executing predetermined programs by one or more computers 500. In some embodiments, at least a part of the functional units described above may be implemented by hardware. In the conference server 10, a storage unit 708 is implemented by a storage device such as the HDD 504 and the HDD controller 505.

The communication unit 701 connects the conference server 10 to the communication network 2 using, for example, the network I/F 508, and executes communication processing that communicates with the terminal devices 100 and the manager terminal device 101.

The conference management unit 702 executes conference management processing for causing multiple terminal devices 100 that access a uniform resource locator (URL) for a web conference to participate in the same conference (session).

The relay unit 703 executes relay processing that relays content data including sound and images between the multiple terminal devices 100 participating in the same conference. Functions of an existing web conference system may be used as the functions of the conference management unit 702 and the relay unit 703.

The acquisition unit 704 executes acquisition processing to acquire the speech sound of a participant participating in a conference (communication) and the speech sound of another participant participating in the same conference. For example, the acquisition unit 704 acquires the speech sound data of the participant and the speech sound data of another participant from the content data relayed by the relay unit 703.

Figure 8:
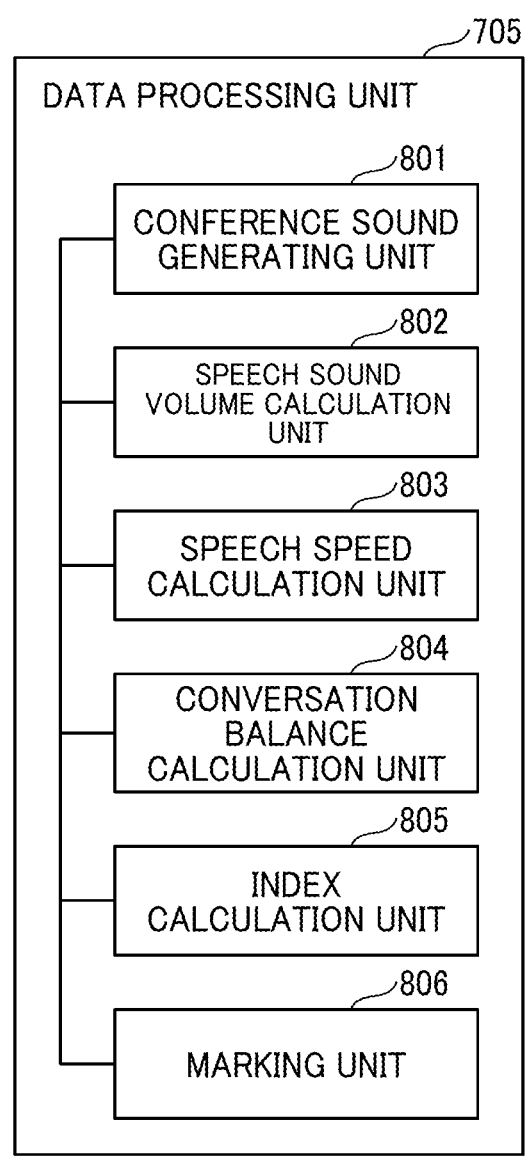
FIG. 8 is a diagram illustrating a functional configuration of a data processing unit according to an embodiment of the present disclosure.

The data processing unit 705 executes data processing on the speech sound data of the participant and the speech sound data of another participant acquired by the acquisition unit 704. As illustrated in FIG. 8, the data processing unit 705 includes, for example, a conference sound generating unit 801, a speech sound volume calculation unit 802, a speech speed calculation unit 803, a conversation balance calculation unit 804, an index calculation unit 805, and a marking unit 806.

The conference sound generating unit 801 executes conference sound generating processing that synthesizes the speech sound of the participant acquired by the acquisition unit 704 and the speech sound of another participant to generate a conference sound including the speech sound of the participant and the speech sound of another participant.

The speech sound volume calculation unit 802 executes speech sound volume calculation processing for calculating the speech sound volume for each speech sound of a participant or another participant using the conference sound generated by the conference sound generating unit 801.

The speech speed calculation unit 803 executes speech speed calculation processing for calculating the speech speed for each speech of the participant or another participant using the conference sound generated by the conference sound generating unit 801. For example, the speech speed calculation unit 803 converts the content of speech into text data using any known speech recognition technique, analyzes the speech converted into text data, and extracts the time of the speech and the number of characters of the speech. The speech speed calculation unit 803 calculates a speech speed (i.e., the result of dividing the number of speech characters by the speech time) from the extracted speech time and the number of speech characters.

The conversation balance calculation unit 804 executes conversation balance calculation processing that calculates an index related to the conversation balance 320 described above, such as a time during which a participant has spoken, a time during which another participant has spoken, and a silent time during which the participant and another participant have not spoken. The conversation balance calculation unit 804 may be included in the index calculation unit 805. The conversation balance calculation unit 804 is optional and may not be included in the data processing unit 705.

The index calculation unit 805 executes index calculation processing that calculates an index indicating the speech state of the participant and an index indicating the speech state of another participant. For example, the index calculation unit 805 calculates a moving average for a predetermined period (e.g., about several seconds to ten and several minutes) based on the data of the speech sound volume calculated by the speech sound volume calculation unit 802 to calculate the speech sound volume of the participant for each predetermined period. Similarly, the index calculation unit 805 calculates the speech sound volume of another participant for each predetermined period. The speech sound volume of the participant for each predetermined period is an example of an index indicating the speech state of the participant. The speech sound volume of another participant for each predetermined period is an example of an index indicating the speech state of another participant.

The index calculation unit 805 calculates a moving average for a predetermined period (e.g., about several seconds to ten and several minutes) based on the data of the speech speed calculated by the speech speed calculation unit 803 to calculate the conversation density of the participant for each predetermined period. The conversation density is an index indicating the number of speech characters (or the number of speech words) within a predetermined time. Similarly, the index calculation unit 805 calculates the conversation density of another participant for each predetermined period. The conversation density of the participant for each predetermined period is an example of an index indicating the speech state of the participant. The conversation density of another participant for each predetermined period is an example of an index indicating the speech state of another participant.

The marking unit 806 executes marking processing that marks a position where the index indicating the speech state of the participant or the index indicating the speech state of another participant calculated by the index calculation unit 805 satisfies a predetermined condition. For example, the marking unit 806 marks a position where the speech sound volume of the participant for each predetermined period or the speech sound volume of another participant for each predetermined period exceeds a first threshold value. In addition, the marking unit 806 marks a position where the conversation density of the participant for each predetermined period or the conversation density of another participant for each predetermined period exceeds a second threshold value.

Referring again to FIG. 7, the description of the functional configuration of the conference server 10 is continued. The information providing unit 706 executes information providing processing that provides a display screen in which an index indicating the speech state of the participant and an index indicating the speech state of another participant are illustrated in time series. For example, the information providing unit 706 displays the display screen 300 described with reference to FIG. 3 or the display screen 400 described with reference to FIG. 4 on the manager terminal device 101 to provide the display screen 300 or the display screen 400.

The sound playback unit 707 (output unit) executes sound playback processing for playing back the speech sound of the selected portion from the index indicating the speech state of the participant illustrated on the display screen provided by the information providing unit 706 or the index indicating the speech state of another participant. In other words, the sound playback unit 707 is configured to output speech content of the selected portion from the index indicating the speech state of the participant illustrated on the display screen provided by the information providing unit 706 or the index indicating the speech state of another participant. For example, the sound playback unit 707 acquires the time of the selected portion and plays back the conference sound generated by the conference sound generating unit 801 from the selected time. The sound playback unit 707 serves as an output unit to output the speech content of a selected portion. For example, the sound playback unit 707 may be an output unit that plays back the speech sound of the selected portion or displays character strings obtained by converting the speech sound of the selected portion into text data. In other words, the sound playback unit 707 may be an output unit that is configured to play back the speech sound of the selected portion or is configured to display character strings obtained by converting the speech sound of the selected portion into text data.

The storage unit 708 stores, for example, various data such as the speech sound acquired by the acquisition unit 704, conference data created by the data processing unit 705 and setting information such as a threshold value.

The terminal device 100 includes, for example, a communication unit 711, a conference control unit 712, a display control unit 713, and an operation reception unit 714, each being implemented by executing predetermined programs in the computer 500 included in the terminal device 100. In some embodiments, at least a part of the functional units described above may be implemented by hardware. In FIG. 7, it is assumed that the terminal device 100b has the same functional configuration as that of the terminal 100a.

The communication unit 711 connects the terminal devices 100 to the communication network 2 using, for example, the network I/F 508, and performs communication processing for communicating with, for example, the conference server 10 or other terminal devices 100.

The conference control unit 712 executes a series of processing related to a web conference, such as connection to the web conference, transmission, and reception of the web conference video (or conference sound), and input and output of the web conference video (or conference sound). The processing executed by the conference control unit 712 may be the same processing of a typical web conference. The conference according to the present embodiment serves as a communication.

The display control unit 713 executes display control processing that displays a display screen on a display unit such as the display 506 under the control of the conference control unit 712 or the information providing unit 706. The operation reception unit 714 executes operation reception processing that receives an operation by the participant using an input device such as the keyboard 509 or the pointing device 510. The conference control unit 712, the display control unit 713, and the operation reception unit 714 may be implemented by, for example, a web browser included in the terminal device 100.

The manager terminal device 101 includes, for example, a communication unit 721, a display control unit 722, and an operation reception unit 723, each being implemented by executing predetermined programs in the computer 500 included in the manager terminal device 101. In some embodiments, at least a part of the functional units described above may be implemented by hardware.

The communication unit 721 connects the manager terminal device 101 to the communication network 2 using, for example, the network I/F 508, and executes communication processing that communicates with, for example, the conference server 10.

The display control unit 722 executes display control processing that displays, for example, a display screen provided from the information providing unit 706 on a display unit such as the display 506. The operation reception unit 723 executes operation reception processing that receives an operation by a manager using an input device such as the keyboard 509 or the pointing device 510. The display control unit 722 and the operation reception unit 723 may be implemented by, for example, a web browser included in the manager terminal device 101.

The functional configuration of the communication support system 1 illustrated in FIG. 7 is an example. For example, as illustrated in FIG. 2, the conference server 10 that provides the web conference service and the communication support apparatus 20 that provides the communication support service may be separately provided. The acquisition unit 704 included in the conference server 10 may be included in the terminal device 100 and transmit the speech sound acquired from the conference control unit 712 to the conference server 10. In other words, each functional configuration of the communication support system 1 illustrated in FIG. 7 may be included in any device included in the communication support system 1.

A description is given below of a processing flow of a communication support method according to the present embodiment.

First Embodiment

Figure 9:
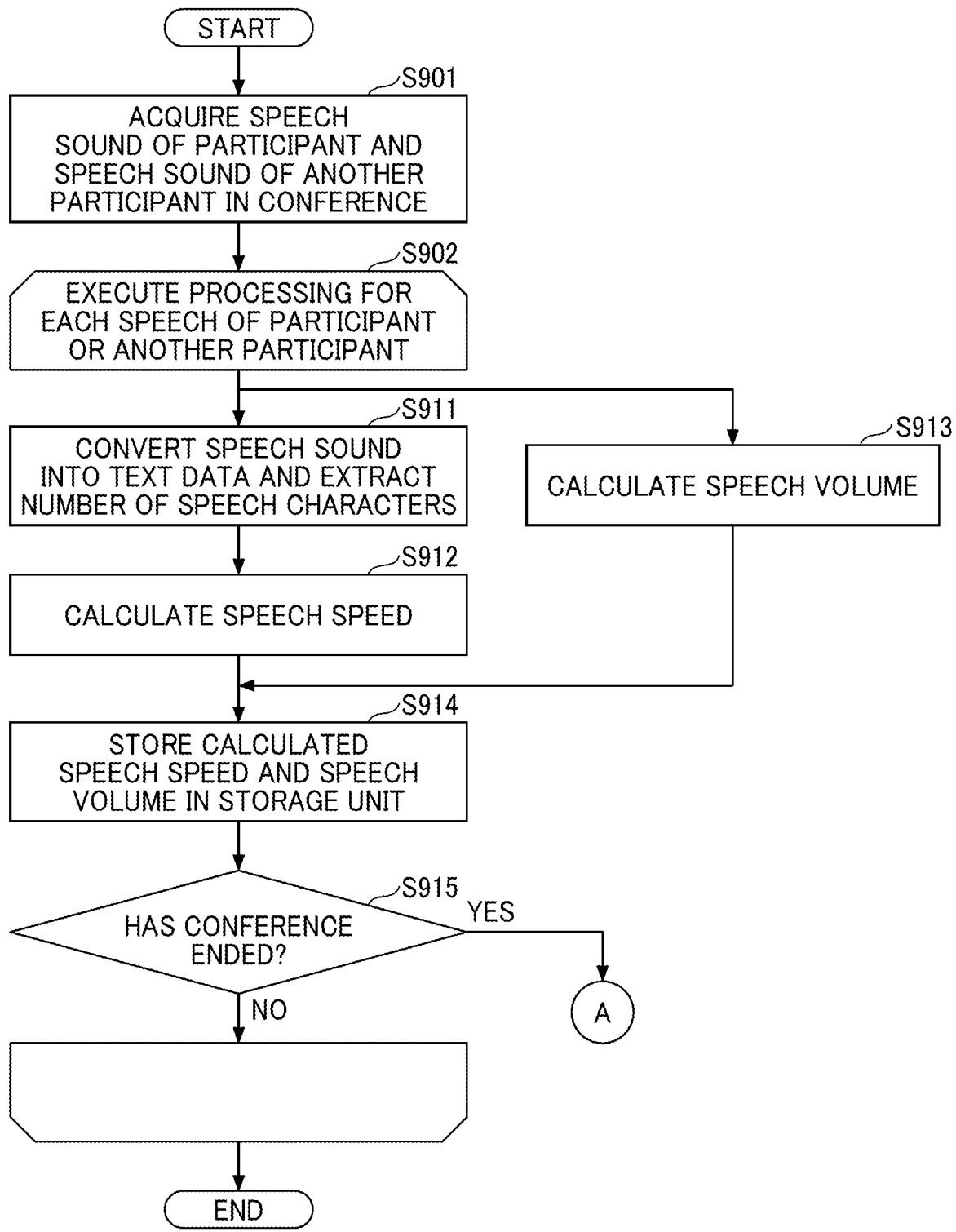
FIG. 9 is a flowchart of data processing according to a first embodiment of the present disclosure.
Figure 10:
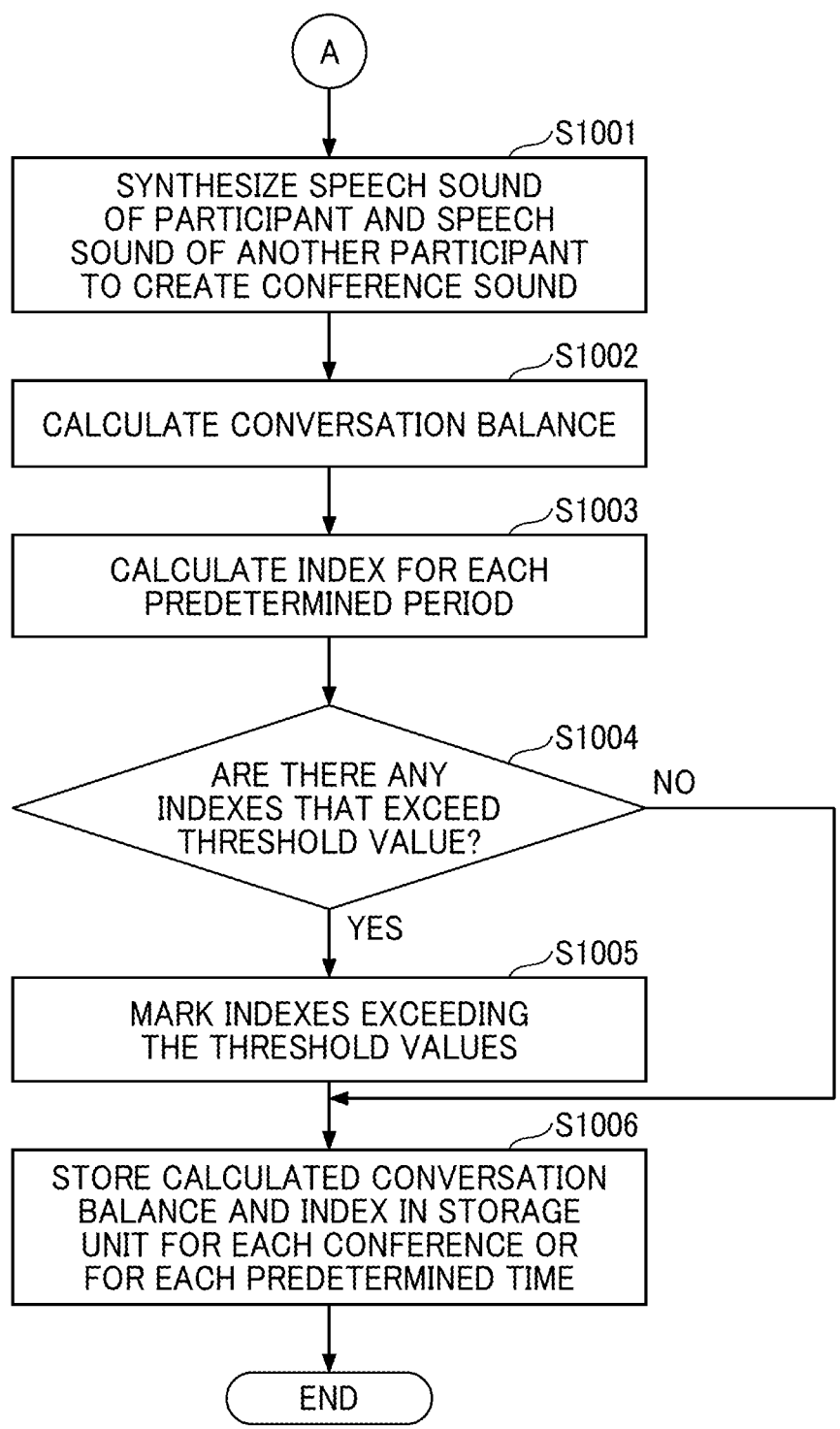
FIG. 10 is another flowchart of data processing according to the first embodiment of the present disclosure.

FIGS. 9 and 10 are flowcharts of data processing according to a first embodiment of the present disclosure. This data processing serves as data processing executed by the communication support system 1 when, for example, the participant who uses the terminal device 100a and another participant who uses the terminal device 100b have a conference (web conference) using the conference server 10. For example, the communication support system 1 executes the processing of steps S901 to S908 of FIG. 9 during the conference and executes the process of FIG. 10 after the end of the conference.

In step S901, the acquisition unit 704 acquires the speech sound of the participant and the speech sound of another participant in the conference. For example, the acquisition unit 704 acquires the speech sound of the participant and the speech sound of another participant from the conference video relayed by the relay unit 703.

In step S902, the data processing unit 705 repeatedly executes the processing of steps S911 to S915 for each speech of the participant or another participant.

In steps S911 and S912, the data processing unit 705 converts the speech sound into text data, extracts the number of speech characters, and calculates the speech speed (i.e., the result of dividing the number of speech characters by the speech time) using the extracted number of speech characters.

In step S913, the data processing unit 705 calculates, for example, the speech sound volume from the speech sound in parallel with the processing in steps S911 and S912.

In step S914, the data processing unit 705 stores the calculated speech speed and speech sound volume in the storage unit 708 for each speech.

In step S915, the data processing unit 705 determines whether the conference has ended. When the data processing unit 705 determines that the conference has ended (YES in step S915), the data processing unit 705 proceeds the processing to step S1001 in FIG. 10. On the other hand, when the data processing unit 705 determines that the conference has not ended (NO in step S915), the data processing unit 705 repeatedly executes the processing of steps S911 to S915 for each speech.

At step S1001 in FIG. 10, the data processing unit 705 synthesizes the speech sounds of the participant and another participant acquired by the acquisition unit 704 to create the conference sound. For example, the data processing unit 705 combines the time information of the speech sound of the participant and the time information of another participant to create the conference sound including the speech sound of the participant and the speech sound of another participant.

In step S1002, the data processing unit 705 calculates a conversation balance based on the created conference sound. For example, the data processing unit 705 calculates data for displaying the conversation balance 320 as illustrated in FIG. 3 such as a time during which the participant has spoken, a time during which another participant has spoken, and a time during which the participant and another participant have not spoken.

In step S1003, the data processing unit 705 calculates an index for each predetermined period. For example, the data processing unit 705 calculates a moving average for a predetermined period from the speech sound volume data of the participant at each time point of the conference to calculate the speech sound volume of the participant for each predetermined period. Similarly, the data processing unit 705 calculates a moving average for a predetermined period from the speech sound volume data of another participant at each time point of the conference to calculate the speech sound volume of another participant for each predetermined period.

The data processing unit 705 calculates a moving average for a predetermined period from the speech speed data of the participant at each time point of the conference to calculate the speech density of the participant for each predetermined period. Similarly, the data processing unit 705 calculates a moving average for a predetermined period from the speech speed data of another participant at each time point of the conference to calculate the speech density of another participant for each predetermined period.

In steps S1004 and S1005, the data processing unit 705 determines whether any of the calculated indexes exceeds the threshold values and marks the indexes exceeding the threshold values. For example, the data processing unit 705 marks a portion where the speech sound volume of the participant for each predetermined period or the speech sound volume of another participant for each predetermined period exceeds the first threshold value. Alternatively, the data processing unit 705 marks a portion where the conversation density of the participant for each predetermined period or the conversation density of another participant for each predetermined period exceeds the second threshold value.

In step S1006, the data processing unit 705 stores the calculated conversation balance and indexes in the storage unit 708 for each conference or for each predetermined time.

Through the processing of FIGS. 9 and 10, the communication support system 1 stores data for creating the display screen 300 as illustrated in FIG. 3 or the display screen 400 as illustrated in FIG. 4 in the storage unit 708 for each conference.

FIG. 11 is a flowchart of display screen providing processing according to the first embodiment of the present disclosure. The process illustrated in FIG. 11 is a process of displaying, for example, a display screen as illustrated in FIGS. 3 and 4 provided by the information providing unit 706 using the manager terminal device 101.

In step S1101, the information providing unit 706 causes a display unit of the manager terminal device 101 to display, for example, a display screen 1200 of a conference list 1201 as illustrated in FIG. 12. For example, the manager can access a predetermined web page provided by the information providing unit 706 using the manager terminal device 101 to display the conference list 1201 on the display screen 1200.

FIG. 12 is a diagram illustrating the display screen 1200 displaying the conference list 1201 according to the first embodiment of the present disclosure. In the conference list 1201, for example, a list of conferences (business negotiations) recently performed by subordinates managed by the manager A is displayed. In FIG. 12, a list of conferences held on May 11, 2022, is displayed in the conference list 1201. The conference list 1201 includes items such as "DATE," "TITLE," "CLIENT," "PERSON IN CHARGE," "REVIEW," and "MARKER."

The item "DATE" is information indicating the date on which the conference was held. The item "TITLE" is information indicating the title of the conference. The item "CLIENT" is information indicating the name of the customer, such as a client name or the name of a person in charge of the client. The item "PERSON IN CHARGE" is information indicating the name of the person in charge (subordinate) who has participated in the conference. The item "REVIEW" is information indicating the review of the conference by the person in charge by, for example, the number of stars in five stages.

For example, the item "MARKER" is displayed as a predetermined display element 1204 (flame in FIG. 12) when there is a marked indicator in step S1005 of FIG. 10. For example, information input by the person in charge when the conference is held is displayed in the item "TITLE," the item "CLIENT," and the item "REVIEW." For example, the information providing unit 706 adds the item "DATE," the item "PERSON IN CHARGE," and the item "MARKER".

A conference in which the item "REVIEW" in a column 1202 in the conference list 1201 is low is considered a conference in which a person in charge is not confident, for example, business negotiations are not successful or a good relationship with a client is not established. As a result, for example, the manager selects a meeting having a lower rate in the item "REVIEW" in the column 1202 to display a display screen as illustrated in FIGS. 3 and 4.

In a conference in which the predetermined display element 1204 is displayed in the item "MARKER" in a column 1203 in the conference list 1201, for example, a marker indicating that the index exceeds the threshold value is displayed on the display screen as illustrated in FIGS. 3 and 4. As another example, the manager may select conferences in which the predetermined display element 1204 is displayed in the item "MARKER" in the column 1203 to display on the display screen as illustrated in FIGS. 3 and 4.

Referring again to FIG. 11, the description of the flowchart of the process to provide the display screen is continued. In step S1102, the information providing unit 706 acquires the conference sound of the conference selected from the conference list 1201 from the storage unit 708. The conference sound is, for example, sound data including the speech sound of the participant and the speech sound of another participant created in step S1001 of FIG. 10.

In step S1103, the information providing unit 706 acquires the index for each predetermined period of the conference selected from the conference list 1201. For example, the information providing unit 706 acquires the indexes for each predetermined time stored in the storage unit 708 in the processing of steps S1003 to S1006 in FIG. 10. The index for each predetermined time includes, for example, the speech sound volume of the participant and the speech sound volume of another participant, or the conversation density of the participant and the conversation density of another participant, which are calculated for each predetermined time.

In step S1104, the information providing unit 706 creates a display screen in which the acquired indexes for each predetermined period are illustrated in time series. For example, as illustrated in FIG. 3, the information providing unit 706 creates a display screen 300 including the sound volume timeline 330 in which the speech sound volume of the participant and the speech sound volume of another participant for each predetermined period are illustrated in time series. Alternatively, as illustrated in FIG. 4, the information providing unit 706 creates a display screen 400 including the conversation density 410 in which the conversation density of the participant and the conversation density of another participant for each predetermined period are illustrated in time series. The information providing unit 706 may create a display screen including the sound volume timeline 330 and the conversation density 410.

In steps S1105 and S1106, the information providing unit 706 determines whether any marked indexes are present. When the marked indexes are present, the information providing unit 706 displays the markers on the display screen created in step S1104. Specifically, when creating the display screen 300 as illustrated in FIG. 3, the information providing unit 706 draws the markers 333a and 333b at the marked portions of the sound volume timeline 330.

In step S1107, the information providing unit 706 provides the created display screen. For example, the information providing unit 706 transmits the display screen 300 as illustrated in FIG. 3 or the display screen 400 as illustrated in FIG. 4 to the manager terminal device 101. As a result, the manager terminal device 101 displays the provided display screen.

The communication support system 1 can execute the process of FIG. 11 to provide, for example, the display screen 300 as illustrated in FIG. 3 or the display screen 400 as illustrated in FIG. 4 to the manager.

Figure 13:
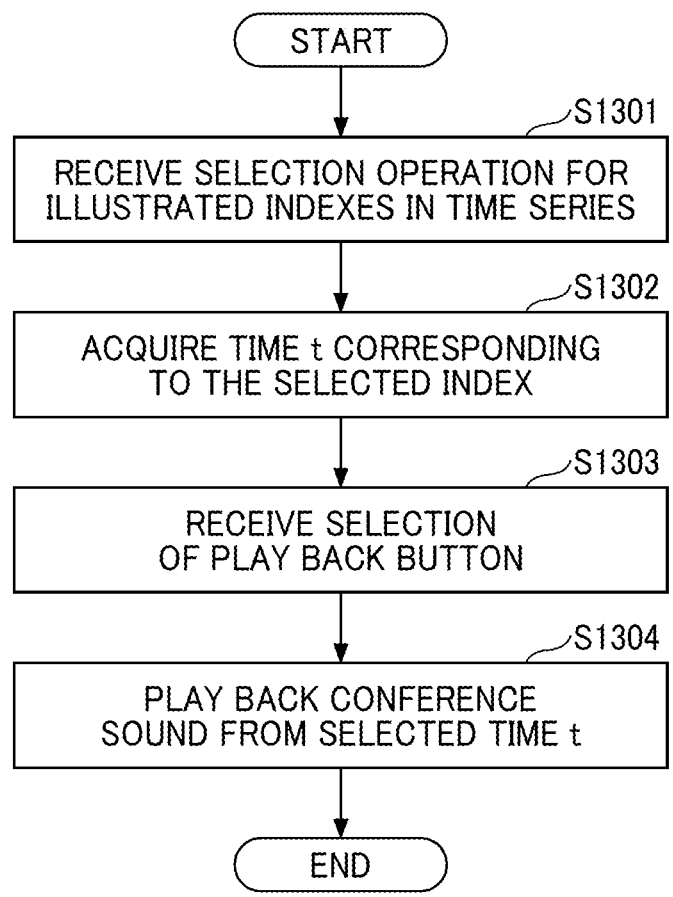
FIG. 13 is a flowchart of playback processing of a conference sound according to the first embodiment of the present disclosure.

FIG. 13 is a flowchart of playback processing of a conference sound according to the first embodiment of the present disclosure. The playback processing of FIG. 13 serves as conference sound playback processing in which the communication support system 1 plays back the conference sound (the speech sound of a participant or the speech sound of another participant) at a portion selected by the manager on the display screen displayed in the process described above with reference to FIG. 12.

In step S1301, when a selection operation by the manager is received with respect to the indexes displayed in time series on the display screen displayed on the manager terminal device 101, the information providing unit 706 executes the processing of step S1302 and subsequent steps.

In step S1302, the information providing unit 706 acquires time t corresponding to the index selected by the manager. For example, when the manger selects a marker 333b on the display screen 300 as illustrated in FIG. 3, the information providing unit 706 moves the bar 335 indicating the playback position to the position of the marker 333b. In addition, the information providing unit 706 acquires the time t corresponding to the position of the bar 335 indicating the playback position.

In steps S1303 and S1304, when the selection of the playback button on the display screen displayed on the manager terminal device 101 is received, the sound playback unit 707 plays back the conference sound (the speech sound of the participant or the speech sound of another participant) from the acquired time t. For example, when the manager selects the playback button 336 on the display screen 300 as illustrated in FIG. 3, the sound playback unit 707 transmits the sound data of the conference sound after the time t to the manager terminal device 101. As a result, the manager terminal device 101 outputs the conference sound after the time t.

The playback processing of the conference sound illustrated in FIG. 13 is an example. For example, the communication support system 1 may omit the processing of step S1303 and start playback of the conference sound at step S1304 from the time t acquired at step S1302. The time t at which the playback of the conference sound is started may be specified by using a progress bar.

As described above, according to the communication support system 1 of the present embodiment, the manager can easily play back the speech sound of the portion where there is a possibility of a problem in the business negotiations by using the indexes indicating the speech states of the participant and another participant displayed on the display screen in time series.

Second Embodiment

In the first embodiment, for example, in steps S1004 and S1005 in FIG. 10, the data processing unit 705 marks a portion that is likely to have a problem in the conference by marking an index that exceeds a preset threshold value.

In the second embodiment, a description is given below of an example of the process in which the data processing unit 705 determines a threshold value using a pre-trained machine learning model based on the data of past meetings.

Figure 14:
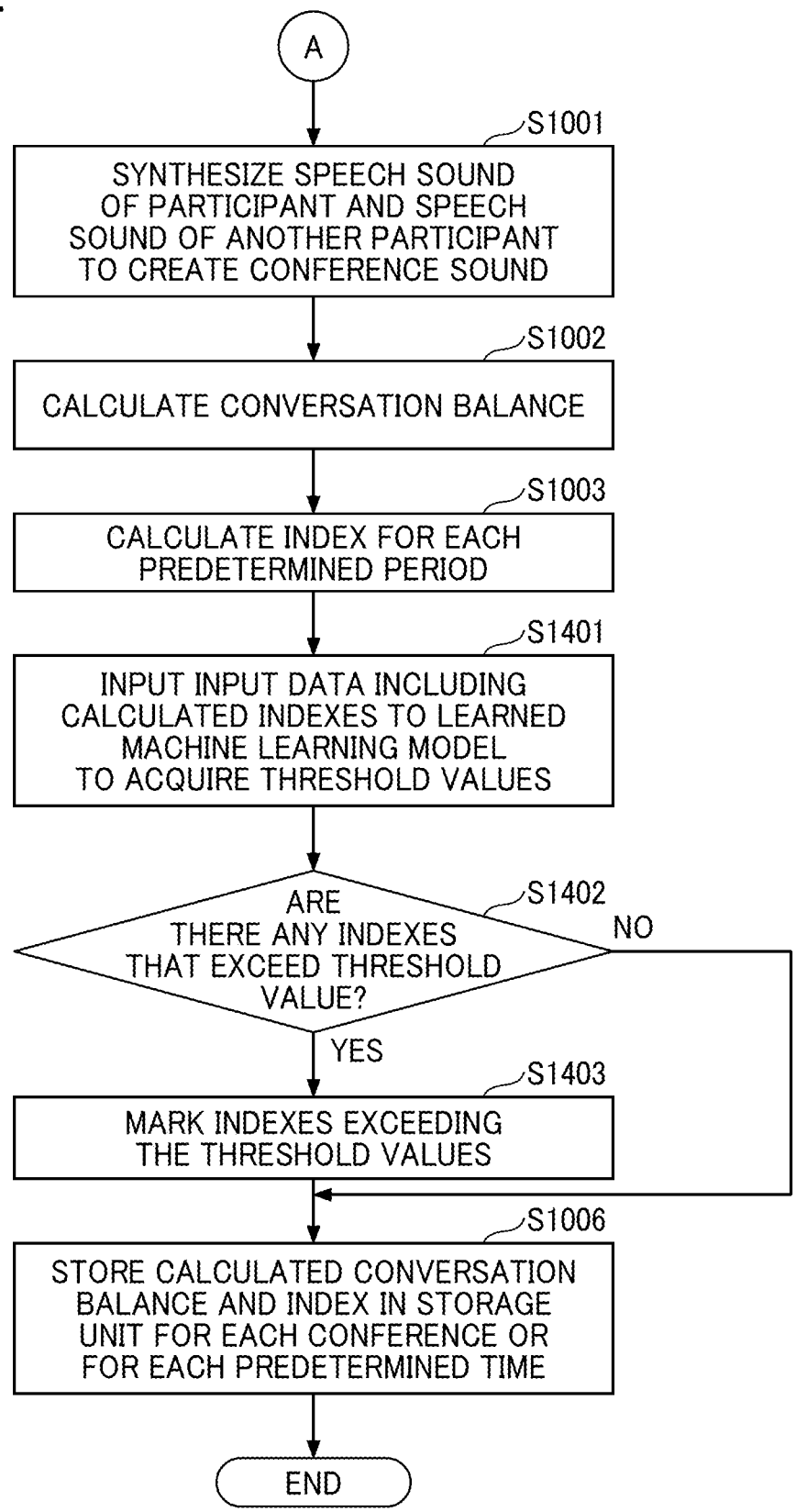
FIG. 14 is a flowchart of data processing according to a second embodiment of the present disclosure.
Figure 15:
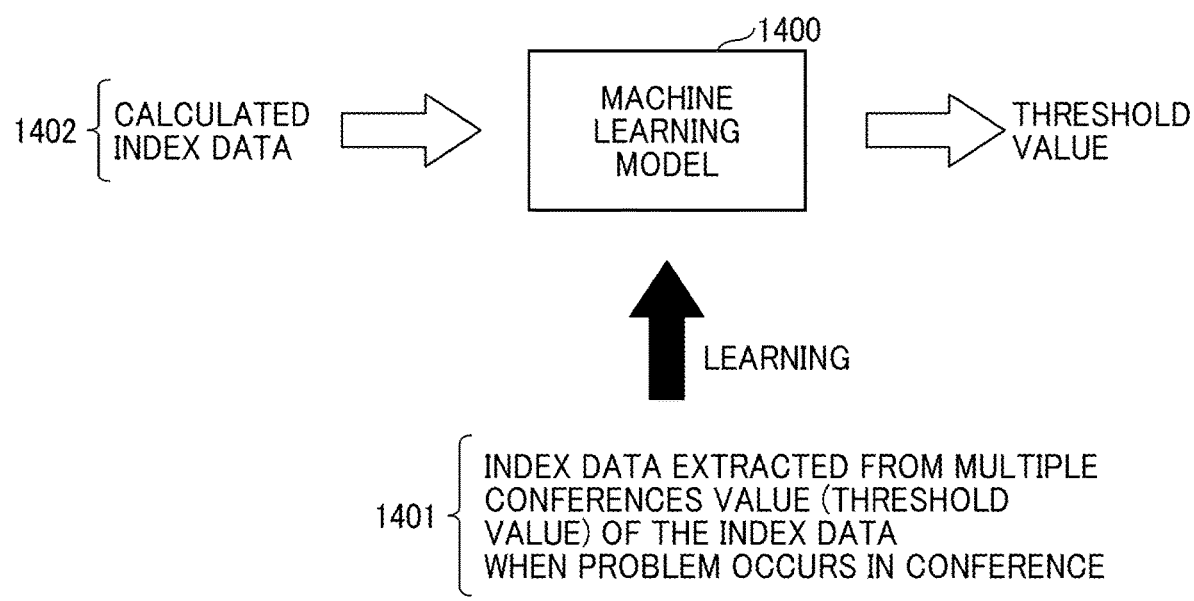
FIG. 15 is a diagram illustrating data processing according to the second embodiment of the present disclosure.

FIG. 14 is a flowchart of data processing according to the second embodiment of the present disclosure. This process is another example of the process executed by the data processing unit 705 when the data processing unit 705 executes the process of FIG. 9 and determines in step S915 that the conference has ended. In the processing illustrated in FIG. 14, the data processing of steps S1001 to S1003 and S1006 are the same as those according to the first embodiment described above with reference to FIG. 10, and thus description thereof is omitted here. Detailed descriptions of the same or substantially the same processes as in the first embodiment are omitted below.

In step S1401, the data processing unit 705 inputs input data including the calculated index to the pre-trained machine learning model to acquire threshold values.

FIG. 14 is the flowchart to explain the data processing according to the second embodiment of the present disclosure. The communication support system 1 stores a pre-trained machine learning model 1400 in the storage unit 708. The pre-trained machine learning model 1400 is a machine learning model that has performed machine learning in advance using training data 1401 including index data extracted from multiple past conferences and a value (threshold value) of the index data when a problem has occurred in the past conference. In this case, the data processing unit 705 inputs input data 1402 including index data that is calculated in step S1003 to the pre-trained machine learning model 1400 to acquire a threshold value indicating the value of the index data that is likely to be problematic from the pre-trained machine learning model 1400.

As another example, the data processing unit 705 may transmit the input data 1402 including the acquired index data to an external server including the pre-trained machine learning model 1400 to acquire the threshold value transmitted by the external server.

In the present disclosure, the machine learning is defined as a technology that makes a computer acquire human-like learning ability. In addition, the machine learning refers to a technology in which a computer autonomously generates an algorithm required for determination such as data identification from learning data loaded in advance and applies the generated algorithm to new data to make a prediction. The learning method for machine learning is not limited to supervised learning, and may be, for example, unsupervised learning, semi-supervised learning, reinforcement learning, and deep learning.

Note that "when a problem has occurred in a past conference" described above may include, for example, when the speech sound volume of the client has become particularly large with respect to the speech volume of the person in charge, or when the conversation density of the person in charge has suddenly decreased failing to immediately respond to a point made by the client.

In addition, "When a problem has occurred in a past conference" described above may include, for example, when both the person in charge and the client excite and the speech sound volume of both is particularly large, or when the person in charge and the client feel uncomfortable and the conversation density of both suddenly decreases. In this case, the data processing unit 705 may mark both the index indicating the speech state of the person in charge and the index indicating the speech state of the client displayed in time series.

The input data 1402 of the pre-trained machine learning model 1400 may include information other than the calculated index data, such as information about the participant (person in charge), information about another participant (client), and information about the type of conference (business negotiations, medical care, a class, or counseling). In this case, the same information described above input to the input data 1402 is added to the training data 1401 to pre-trained the machine learning model 1400 is machine-learned in advance. Accordingly, the data processing unit 705 can acquire a more appropriate threshold value in accordance with, for example, the person in charge, the client, or the type of conference.

The communication support system 1 may, for example, use multiple pre-trained machine learning models 1400 that are different according to the elapsed time from the start time point of the conference to acquire a different threshold value for each elapsed time period. Accordingly, the data processing unit 705 can acquire a more appropriate threshold value in accordance with, for example, the elapsed time from the start time point of the conference.

Referring again to FIG. 14, the description of the flowchart of the data processing is continued. In steps S1402 and S1403, the data processing unit 705 compares the calculated indexes with the threshold values acquired in step S1401 and determines whether any of the indexes exceeds the threshold values. When an index exceeds the threshold value (YES in step S1402), the data processing unit 705 marks the index exceeding the threshold value. When there are multiple indexes calculated in step S1003, the data processing unit 705, for example, executes the processing of steps S1401 to S1403 for each of the multiple indexes.

Through the processing of FIG. 14, the communication support system 1 can determine a more appropriate threshold value using a pre-trained machine learning model that has been pre-trained in advance based on the data of past conferences.

Third Embodiment

In the description of the first and second embodiments, the communication supported by the communication support system 1 is a web conference in which video including audio is transmitted and received between the user of the terminal device 100 and the user of another terminal device 100 and business negotiations are performed. However, this is an example, and the communication support system 1 may support, for example, various communications in a metaverse which is a virtual space on the Internet. For example, the communication support system 1 can support the various communications such as a game play, business negotiations, a conference, shopping, medical care, and a lecture in the metaverse. In the present embodiment, description is given below of assuming that the communication support system 1 supports later confirmation of communication between players who participate in the game play in the metaverse.

Figure 16:
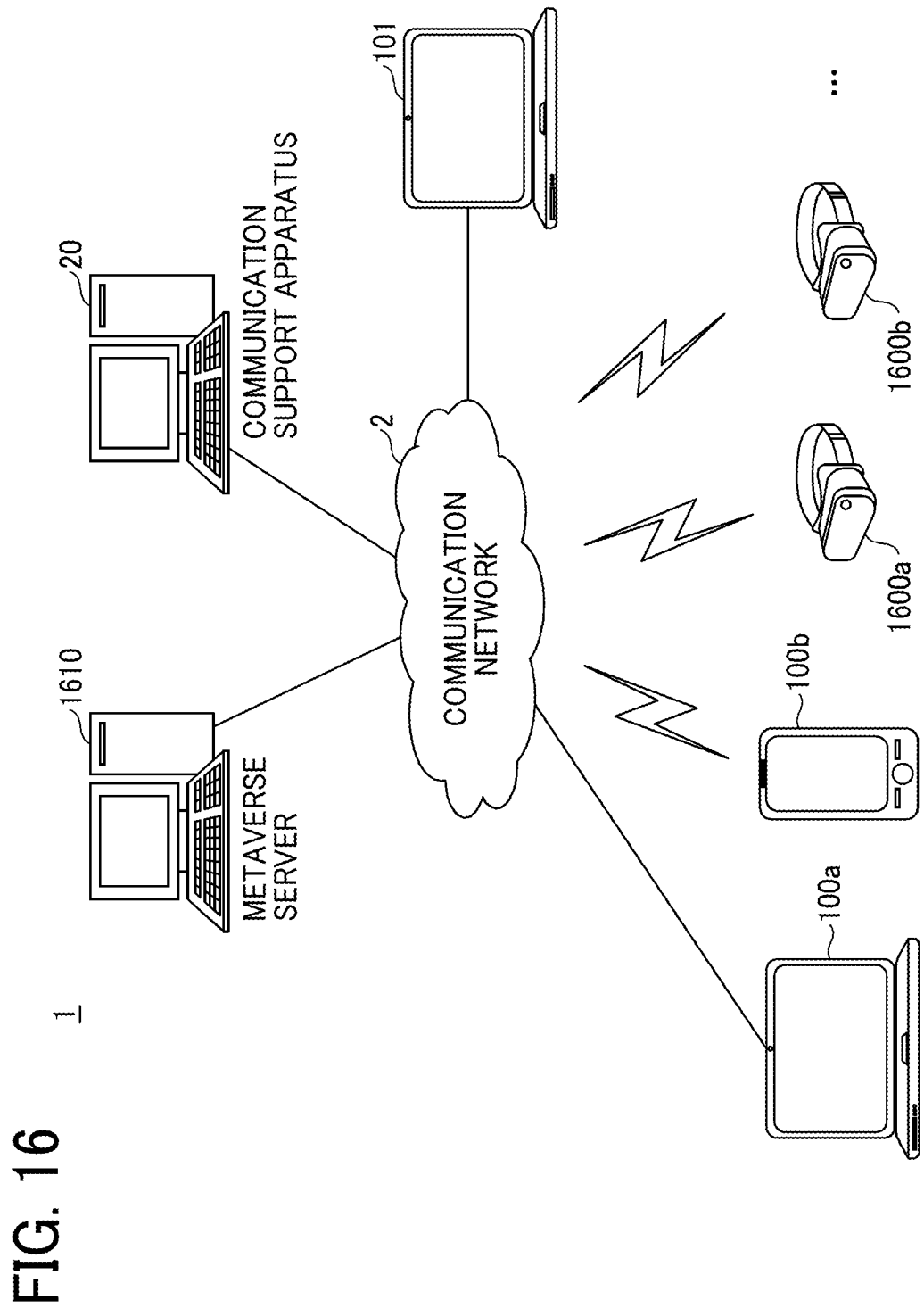
FIG. 16 is a diagram illustrating a system configuration of a communication support system according to a third embodiment of the present disclosure.

FIG. 16 is a diagram illustrating a system configuration of the communication support system 1 according to a third embodiment of the present disclosure. The communication support system 1 according to the third embodiment includes, for example, a metaverse server 1610, a metaverse terminal device 1600a, a metaverse terminal device 1600b, a communication support apparatus 20, and a manager terminal device 101, which are connected to a communication network 2. In the following description, when any one or more of the multiple terminals including the metaverse terminal device 1600a and the metaverse terminal device 1600b is indicated may be referred to as a "terminal device 1600" or "terminal devices 1600."

The metaverse server 1610 is an information processing apparatus having a configuration of a computer or a system including multiple computers. The metaverse server 1610 provides a service such as a game in the metaverse to the terminal devices 1600. The metaverse server 1610 may be an external server of the communication support system 1. The terminal device 1600 is for example, virtual reality (VR) goggle, VR headset, or head mounted display (HMD) such as an augmented reality (AR) glasses, for using the services provided by metaverse server 1610. However, the terminal device 1600 is not limited to HMD, and may be, for example, the general-purpose terminal devices 100a and 100b, such as Pcs, smartphones, or tablet terminals, which execute application programs for the metaverse. The terminal device 1600 may communicate with the metaverse server 1610 via the other devices such as the terminal device 100a and the terminal device 100b. In the following, a description is provided on the assumption that the terminal devices 1600 communicate with the metaverse server 1610 not via the other devices such as the terminal device 100a and the terminal device 100b.

The communication support apparatus 20 is an information processing apparatus having a configuration of a computer or a system including multiple computers. In the metaverse provided by the metaverse server 1610, the communication support apparatus 20 provides a communication support service for supporting to confirm a conversation later between a user of the terminal device 1600a and the user of the terminal device 1600b.

For example, the communication support system 1 has the function of recording in real time a conversation (communication) between a participant who uses the terminal device 1600a and another participant who uses the terminal device 1600b in the metaverse.

The communication support system 1 provides a display screen in which indexes indicating speech states of the participant using the terminal device 1600a and another participant using the terminal device 1600b are illustrated in time series based on the recorded conversation sound. The communication support system 1 according to the third embodiment further has a function of displaying, on the display screen, markers (display elements) indicating portions at which the participant who uses the terminal device 1600a or another participant who uses the terminal device 1600b has spoken a predetermined keyword.

For example, when the communication supported by the communication support system 1 is a game played in the metaverse, the communication support system 1 provides the display screen described above to the terminal devices 1600a or terminal device 100b used by the participants. As a result, the participant can easily specify the portion where the predetermined keyword is spoken from the index indicating the speech state of the participant and the index indicating the speech state of another participant displayed on the display screen.

When the communication supported by the communication support system 1 is business negotiations performed in the metaverse, the communication support system 1 displays the display screen on the manager terminal device 101 used by the manager. As a result, the manager can easily specify the portion where the predetermined keyword is spoken from the index indicating the speech state of the participant and the index indicating the speech state of another participant displayed on the display screen.

The communication support system 1 further has the function of outputting speech content of a selected portion from the index indicating the speech state of the participant and the index indicating the speech state of another participant displayed on the display screen. For example, the communication support system 1 plays back the speech sound of the selected portion from the index indicating the speech state of the participant and the index indicating the speech state of another participant displayed on the display screen. Alternatively, the communication system 1 displays character strings obtained by converting the speech sound of the selected portion into text data from the index indicating the speech state of the participant and the index indicating the speech state of another participant displayed on the display screen. As a result, the participant (or the manager) can easily confirm the content of the conversation when the predetermined keyword is spoken later.

The system configuration of the communication support system 1 illustrated in FIG. 16 is an example. For example, the metaverse server 1610 may have the function of the communication support apparatus 20. The communication support system 1 may not include the manager terminal device 101.

Figure 17:
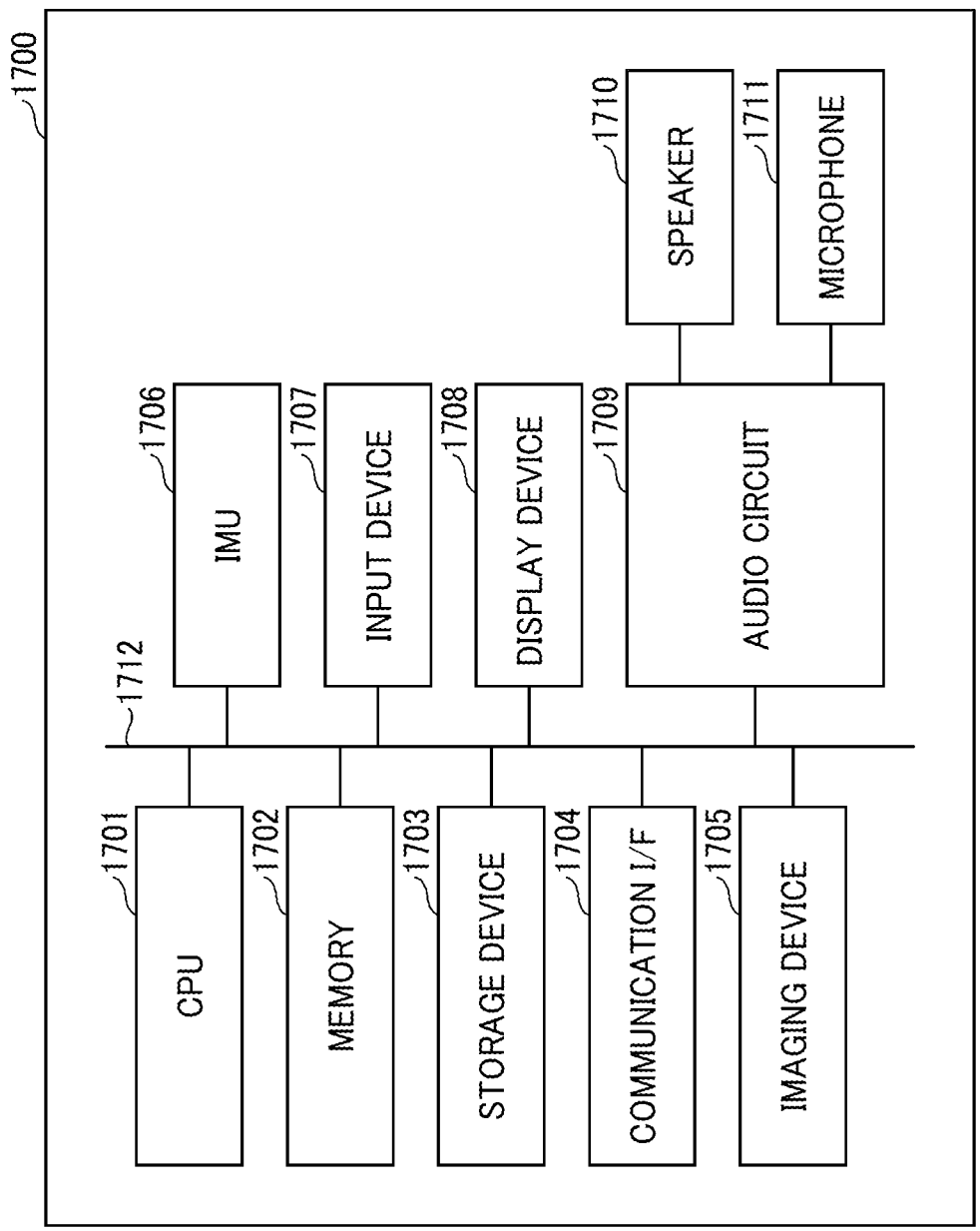
FIG. 17 is a diagram illustrating a hardware configuration of a head-mounted display (HMD) according to the third embodiment of the present disclosure.

The terminal device 1600 according to the third embodiment has a hardware configuration of an HMD 1700 as illustrated in FIG. 17.

FIG. 17 is a diagram illustrating a hardware configuration of the HMD 1700 according to the third embodiment of the present disclosure. The HMD 1700 includes a CPU 1701, a memory 1702, a storage device 1703, a communication I/F 1704, an imaging device 1705, an inertial measurement unit (IMU) 1706, an input device 1707, a display device 1708, an audio circuit 1709, a speaker 1710, a microphone 1711, and a bus 1712.

The CPU 1701 is, for example, a processor that reads programs and data from a storage device such as the storage device 1703 onto the memory 1702, and executes processing according to the programs or data, to implement functions of the HMD 1700. The memory 1702 includes, for example, a RAM used as a work area of the CPU 1701, and a ROM storing programs for activating the CPU 1701. The storage device 1703 is a large-capacity non-volatility storage device that stores an OS, application programs, and various types of data.

The communication I/F 1704 includes, for example, a communication interface such as a wireless local area network (LAN) or a wireless wide area network (WAN). The imaging device 1705 is an imaging device such as a camera that captures objects surrounding the HMD 1700. The IMU 1706 is, for example, an inertial measurement device that acquires posture information of the HMD 1700. For example, the IMU 1706 uses a three-axis gyroscope sensor and a three-way acceleration sensor to detect three-dimensional angular velocities and accelerations.

The input device 1707 is an input device that receives input from the outside, such as a touch panel, an operation button, or a pointing device. The display device 1708 is, for example, a display device that displays a game screen in the metaverse.

The audio circuit 1709 outputs an audio signal to the speaker 1710 under the control of the CPU 1701 and amplifies an audio signal input from the microphone 1711. The speaker 1710 converts the audio signal input from the audio circuit 1709 into sound and outputs the sound. The speaker 1710 may be an earphone or a headphone. The microphone 1711 acquires sound around the HMD 1700, converts the sound into a sound signal, and outputs the sound signal to the audio circuit 1709. The bus 1712 is connected to each of the components described above and transmits, for example, an address signal, a data signal, and various control signals.

Figure 18:
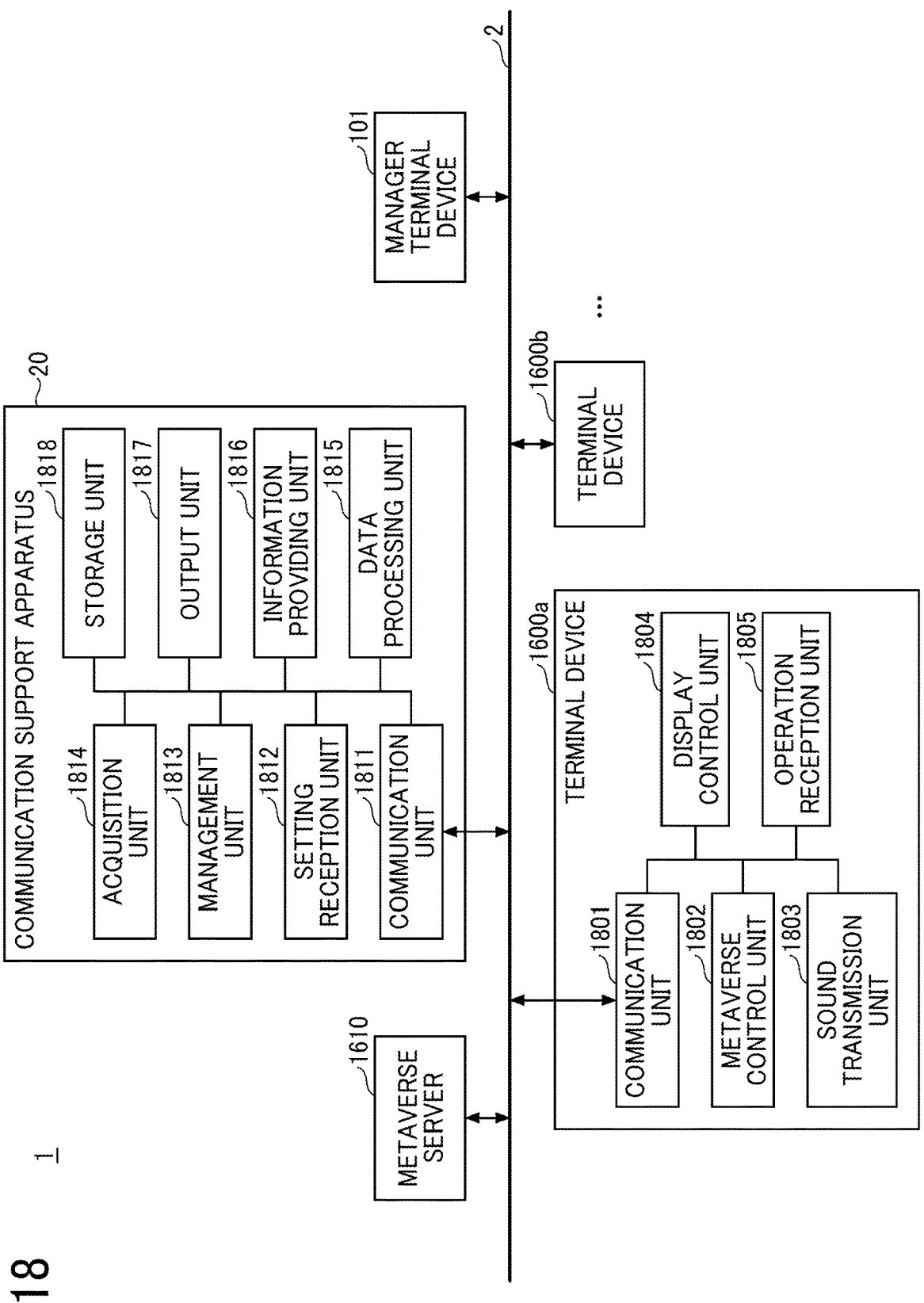
FIG. 18 is a diagram illustrating a functional configuration of a communication support system according to the third embodiment of the present disclosure.

FIG. 18 is a diagram illustrating a functional configuration of the communication support system 1 according to the third embodiment of the present disclosure.

The terminal device 1600 causes the CPU 1701 to execute programs stored in a storage device such as the storage device 1703 to implement the functional configuration of the terminal device 1600 as illustrated in FIG. 18. In FIG. 18, the terminal device 1600 includes a communication unit 1801, a metaverse control unit 1802, a sound transmission unit 1803, a display control unit 1804, and an operation reception unit 1805. In some embodiments, at least a part of the functional units described above may be implemented by hardware. The terminal device 1600 (for example, the terminal device 1600*b*) used by another participant may not include (may include) the sound transmission unit 1803.

The communication unit 1801 connects the terminal device 1600 to the communication network 2 using, for example, the communication I/F 1704, and performs communication processing to communicate with other devices such as the metaverse server 1610 and the communication support apparatus 20.

The metaverse control unit 1802, for example, connects to the metaverse server 1610 using the communication unit 1801 and performs control related to the game play in the metaverse. For example, the metaverse control unit 1802 controls the input and output of sound using the audio circuit 1709 and the display of a game screen by the display control unit 1804. The metaverse control unit 1802 may be implemented by, for example, a general game application program executed by the CPU 1701.

The sound transmission unit 1803 acquires a speech sound of the participant participating in the game in the metaverse (for example, the user using the terminal device 1600*a*) and a speech sound of another participant participating in the game (for example, the user using the terminal device 100*b*). The sound transmission unit 1803 transmits the acquired speech sound to the communication support apparatus 20. For example, the sound transmission unit 1803 acquires the speech sound acquired by the microphone 1711 and the speech sound output from the speaker 1710 from the audio circuit 1709 and transmits the acquired speech sound (sound data) to the communication support apparatus 20. As a result, the sound transmission unit 1803 can acquire the speech sound of the participant and the speech sound of another participant and transmit them to the communication support apparatus 20 without depending on the connected metaverse server 1610 or the game application program.

The sound transmission unit 1803 may acquire the speech sound (sound data) of the participant and the speech sound of another participant from the metaverse control unit 1802 and transmit the acquired speech sound to the communication support apparatus 20.

The display control unit 1804 executes, for example, display control processing of displaying a display screen of the game play in the metaverse by the metaverse control unit 1802 on a display unit such as the display device 1708.

The operation reception unit 1805 executes operation reception processing of receiving an operation by the user (participant) who uses the terminal device 1600. For example, the operation reception unit 1805 receives an input operation with respect to a display screen of the game play in the metaverse displayed by the display control unit 1804.

The communication support apparatus 20 implements the functional configuration of the communication support apparatus 20 as illustrated in FIG. 18, for example, by executing predetermined programs in the computer 500 included in the communication support apparatus 20. In FIG. 18, the communication support apparatus 20 has a functional configuration including a communication unit 1811, a setting reception unit 1812, a management unit 1813, an acquisition unit 1814, a data processing unit 1815, an information providing unit 1816, an output unit 1817, and a storage unit 1818. In some embodiments, at least a part of the functional units described above may be implemented by hardware.

The communication unit 1811 uses the communication I/F 1704 to connect the communication support apparatus 20 to the communication network 2, and executes communication processing for communicating with other apparatuses such as the terminal devices 1600.

The setting reception unit 1812 executes setting reception processing for receiving a setting of the communication support system 1. For example, the setting reception unit 1812 displays a setting screen on the terminal device 1600 (or the terminal device 100) used by the participant or the manager terminal device 101, and receives the set setting information (e.g., a predetermined keyword).

The management unit 1813 stores and manages various kinds of information related to the communication support system 1 in the storage unit 1818. For example, the management unit 1813 manages the setting information received by the setting reception unit 1812.

The acquisition unit 1814 executes acquiring processing of acquiring the speech sound of the participant who participates in communication performed in the metaverse provided by the metaverse server 1610 and the speech sound of another participant who participates in the communication. For example, the acquisition unit 1814 acquires the speech sound (sound data) of a participant participating in a game played in the metaverse and the speech sound (sound data) of another participant participating in the game.

The conversation between the participants of the game performed in the metaverse is an example of communication according to the third embodiment. The communication according to the third embodiment may be, for example, conversation such as business negotiations, a conference, shopping, medical care, or a lecture in the metaverse.

The data processing unit 1815 performs data processing on the speech sound (sound data) of the participant and the speech sound (sound data) of another participant acquired by the acquisition unit 1814. The data processing unit 1815 according to the third embodiment has, for example, a functional configuration as illustrated in FIG. 19.

Figure 19:
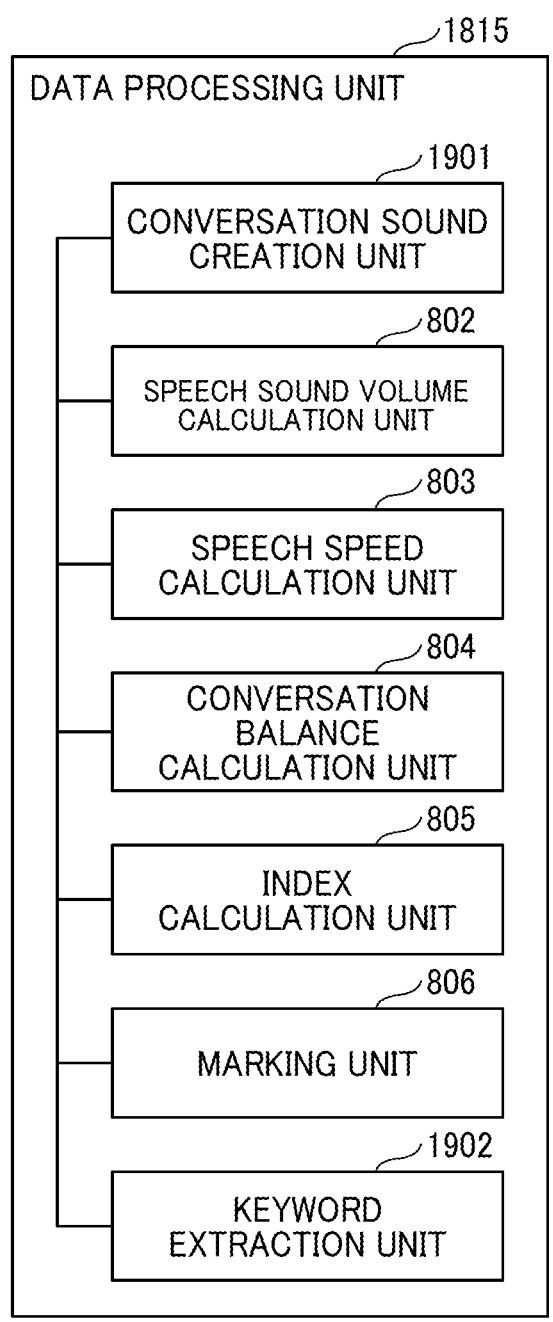
FIG. 19 is a diagram illustrating a functional configuration of a data processing unit according to the third embodiment of the present disclosure.

FIG. 19 is a diagram illustrating a functional configuration of the data processing unit 1815 according to the third embodiment of the present disclosure. As illustrated in FIG. 19, the data processing unit 1815 according to the third embodiment has a functional configuration including a conversation sound creation unit 1901, a speech sound volume calculation unit 802, a speech speed calculation unit 803, a conversation balance calculation unit 804, an index calculation unit 805, a marking unit 806, and a keyword extraction unit 1902. The speech sound volume calculation unit 802, the speech speed calculation unit 803, the conversation balance calculation unit 804, the index calculation unit 805, and the marking unit 806 are the same as the functional configurations described with reference to FIG. 8, and thus detailed description thereof is omitted here.

The conversation sound creation unit 1901 performs conversation sound creation processing to synthesize the speech sound of the participant acquired by the acquisition unit 1814 and the speech sound of another participant to create a conversation sound including the speech sound of the participant and the speech sound of another participant.

The speech sound volume calculation unit 802 executes speech sound volume calculation processing for calculating a speech sound volume for each speech of the participant or another participant using the conversation sound created by the conversation sound creation unit 1901. The speech speed calculation unit 803 executes speech speed calculation processing for calculating a speech speed for each speech of the participant or another participant using the conversation sound created by the conversation sound creation unit 1901. The conversation balance calculation unit 804 executes conversation balance calculation processing that calculates an index related to the conversation balance 320 described above, such as a time during which a participant has spoken, a time during which another participant has spoken, and a silent time during which the participant and another participant have not spoken. The index calculation unit 805 executes index calculation processing that calculates an index indicating the speech state of the participant and an index indicating the speech state of another participant. The marking unit 806 executes marking processing that marks a position where the index indicating the speech state of the participant or the index indicating the speech state of another participant calculated by the index calculation unit 805 satisfies a predetermined condition.

The keyword extraction unit 1902 executes keyword extraction processing of extracting a predetermined keyword from the conversation sound converted into text data by the speech speed calculation unit 803 and marking the extracted keyword, the speaker, and the degree of progress in association with each other.

The "keyword" is, for example, a keyword spoken in the game play in the metaverse. For example, when the game in the metaverse is a fantasy game, the participant (or manager) registers keywords such as "monster," "right," and "fire magic" appearing in the game in the communication support apparatus 20 in advance. The "speaker" is information for identifying a participant (player) who has spoken the keyword (for example, the name of the player or identification information). The "degree of progress" is information indicating the degree of progress of a game (e.g., information indicating an elapsed time from the start of the game, a chapter of the game, or a location in the game).

Referring again to FIG. 18, the description of the functional configuration of the communication support apparatus 20 is continued. The information providing unit 1816 executes information providing processing of providing a display screen in which indexes indicating the speech state of the participant and indexes indicating a speech state of another participant are illustrated in time series. For example, the information providing unit 1816 creates a display screen in which the indexes indicating the speech state of the participant and the indexes indicating the speech state of another participant are illustrated in time series. Then, the information providing unit 1816 provides the created display screen to the terminal devices 1600, the terminal device 100, or the manager terminal device 101 used by the participant to display the created display screen.

The output unit 1817 executes output processing of outputting the speech content of the selected portion from the indexes indicating the speech state of the participant or the index indicating the speech state of another participant. The indexes indicating the speech state of the participant and the index indicating the speech state of another participant are illustrated on the display screen provided by the information providing unit 706. For example, the output unit 1817 acquires the time of the selected portion and plays back (outputs) the conversation sound created by the data processing unit 1815 from the acquired time of the selected portion. Alternatively, the output unit 1817 may display (output) character strings obtained by converting the speech sound of the selected portion into text data.

The storage unit 1818 stores, for example, various kinds of information including various setting information managed by the management unit 1813, data, and programs.

The functional configuration of the manager terminal device 101 may be the same as that of the manager terminal device 101 described with reference to FIG. 7. The metaverse server 1610 may be a general cloud service that provides a game service in the metaverse, and thus description thereof is omitted here.

Figure 20:
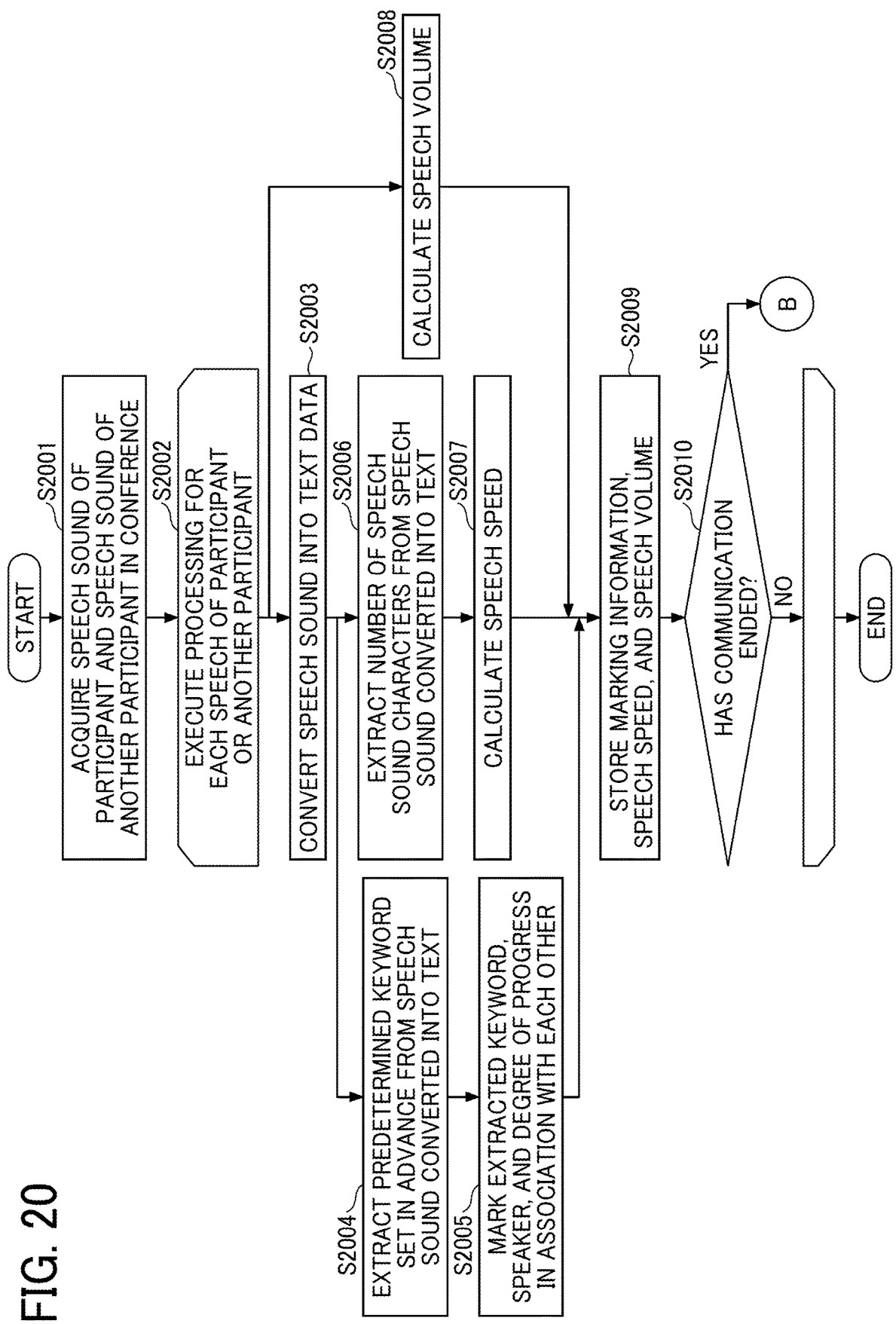
FIG. 20 is a flowchart of data processing according to the third embodiment of the present disclosure.
Figure 21:
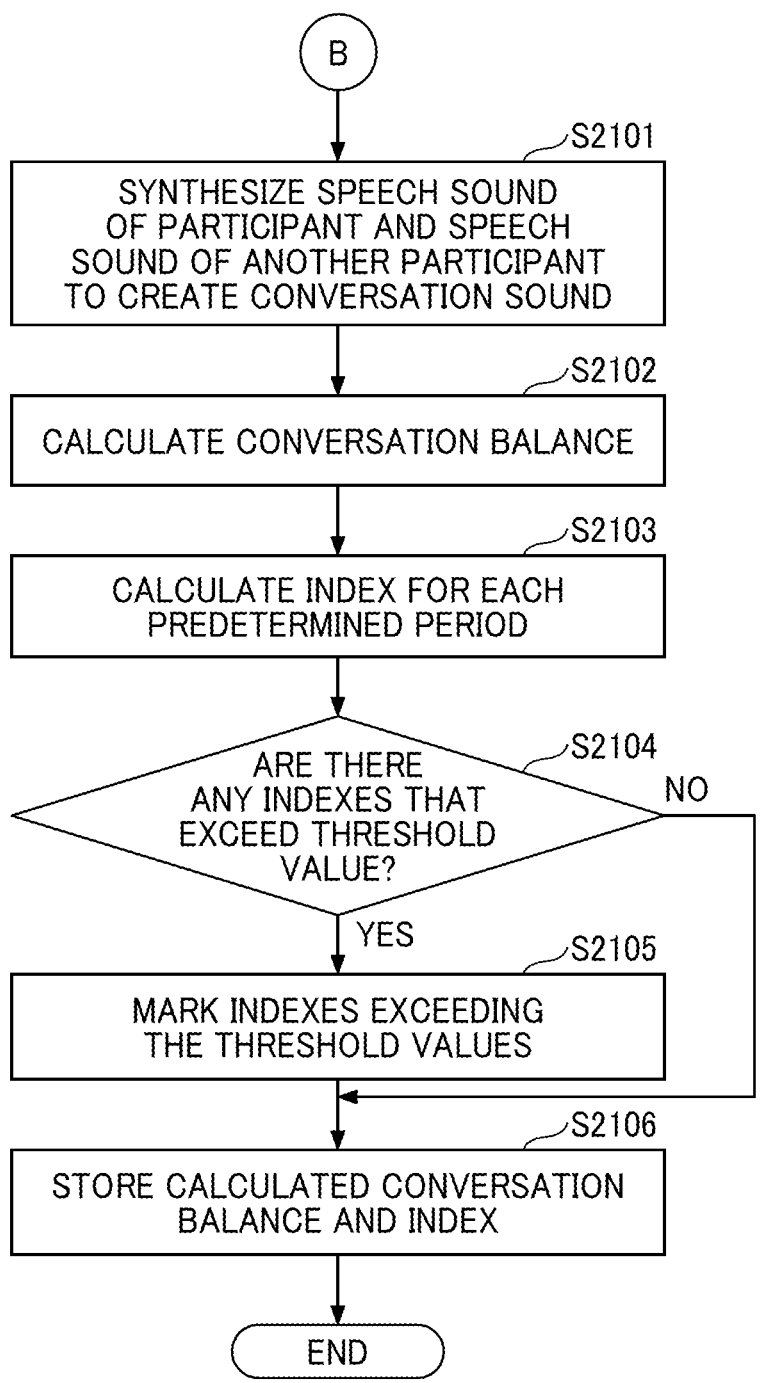
FIG. 21 is another flowchart of data processing according to the third embodiment of the present disclosure.

FIGS. 20 and 21 are flowcharts of data processing according to the third embodiment. This processing is data processing executed by the communication support system 1 when the participant using the terminal device 1600*a* and another participant using the terminal device 1600*b* play the game using the metaverse server 1610. For example, the communication support system 1 executes the processing of steps S2001 to S2010 of FIG. 20 during the game play and executes the processing of FIG. 21 after the end of the game play. A detailed description of the same or substantially the same processing as the data processing according to the first embodiment described with reference to FIGS. 9 and 10 is omitted in the following description.

In step S2001, the acquisition unit 1814 acquires the speech sound of the participant playing the game in the metaverse and the speech sound of another participant. For example, the acquisition unit 1814 acquires the speech sound of the participant and the speech sound of another participant transmitted by the sound transmission unit 1803 of the terminal device 1600a.

In step S2002, the data processing unit 1815 repeatedly executes the processing of steps S2003 to S2010 for each speech of the participant or another participant.

In step S2003, the data processing unit 1815 converts the acquired speech sound into text data.

In step S2004, the keyword extraction unit 1902 extracts a predetermined keyword set in advance from the speech sound converted into text data. In step S2005, the keyword extraction unit 1902 marks the extracted keyword, the speaker, and the degree of progress in association with each other. For example, the keyword extraction unit 1902 creates marking information including the extracted keyword, information of the participant (player) who has spoken the keyword, and information indicating the degree of progress (e.g., the elapsed time from the start of the game).

The speech speed calculation unit 803 executes the processing of steps S2004 and S2005 in parallel with the processing of steps S2006 and S2007. In step S2006, the speech speed calculation unit 803 extracts the number of speech characters from the speech sound converted into text data. In step S2007, the speech speed calculation unit 803 calculates a speech speed (number of speech characters per speech time) using the extracted number of speech characters.

In step S2008, the speech sound volume calculation unit 802 calculates the speech sound volume from the acquired speech sound in parallel with the processing in steps S2003 to S2007.

In step S2009, the data processing unit 1815 stores the marking (marking information), the speech speed, and the speech sound volume in the storage unit 708 for each speech.

In step S2010, the data processing unit 1815 determines whether the communication (e.g., game play) has ended. When the data processing unit 1815 determines that the communication has ended (YES in step S2010), the data processing unit 1815 proceeds the processing to step S2101 in FIG. 21. On the other hand, when the communication has not ended (NO in step S2010), the data processing unit 1815 repeatedly executes the processing of steps S2003 to S2009 for each speech.

When the processing proceeds to step S2101 in FIG. 21, the conversation sound creation unit 1901 synthesizes the speech sound of the participant acquired by the acquisition unit 1814 and the speech sound of another participant to create the conversation sound. For example, the conversation sound creation unit 1901 combines the time information of the speech sound of the participant and the time information of another participant to create a conversation sound including the speech sound of the participant and the speech sound of another participant.

In step S2102, the conversation balance calculation unit 804 calculates the conversation balance based on the created conversation sound. For example, the conversation balance calculation unit 804 calculates data for displaying the conversation balance 320 as illustrated in FIG. 3, such as a time during which a participant has spoken, a time during which another participant has spoken, and a silent time during which the participant and another participant have not spoken in the conversation.

In step S2103, the index calculation unit 805 calculates indexes for each predetermined period. For example, the index calculation unit 805 calculates a moving average for a predetermined period from the speech sound volume data of the participant at each time point of the communication (e.g., a game) to calculate the speech sound volume of the participant for each predetermined period. Similarly, the index calculation unit 805 calculates a moving average for a predetermined period from the speech sound volume data of another participant at each time point of the communication to calculate the speech sound volume of another participant for each predetermined period.

The index calculation unit 805 calculates a moving average for a predetermined period from the speech speed data of the participant at each time point of the communication to calculate the speech density of the participant for each predetermined period. Similarly, the index calculation unit 805 calculates a moving average for a predetermined period from the speech speed data of another participant at each time point of the communication to calculate the speech density of another participant for each predetermined period.

In steps S2104 and S2105, the marking unit 806 determines whether any the calculated indexes exceed the threshold values and marks the indexes exceeding the threshold values. For example, the marking unit 806 marks a position where the speech sound volume of the participant for each predetermined period or the speech sound volume of another participant for each predetermined period exceeds the first threshold value. In addition, the marking unit 806 marks a position where the conversation density of the participant for each predetermined period or the conversation density of another participant for each predetermined period exceeds the second threshold value.

In step S2106, the data processing unit 1815 stores the calculated conversation balance and the indexes in the storage unit 1818 for each communication or for each predetermined time.

Figure 22:
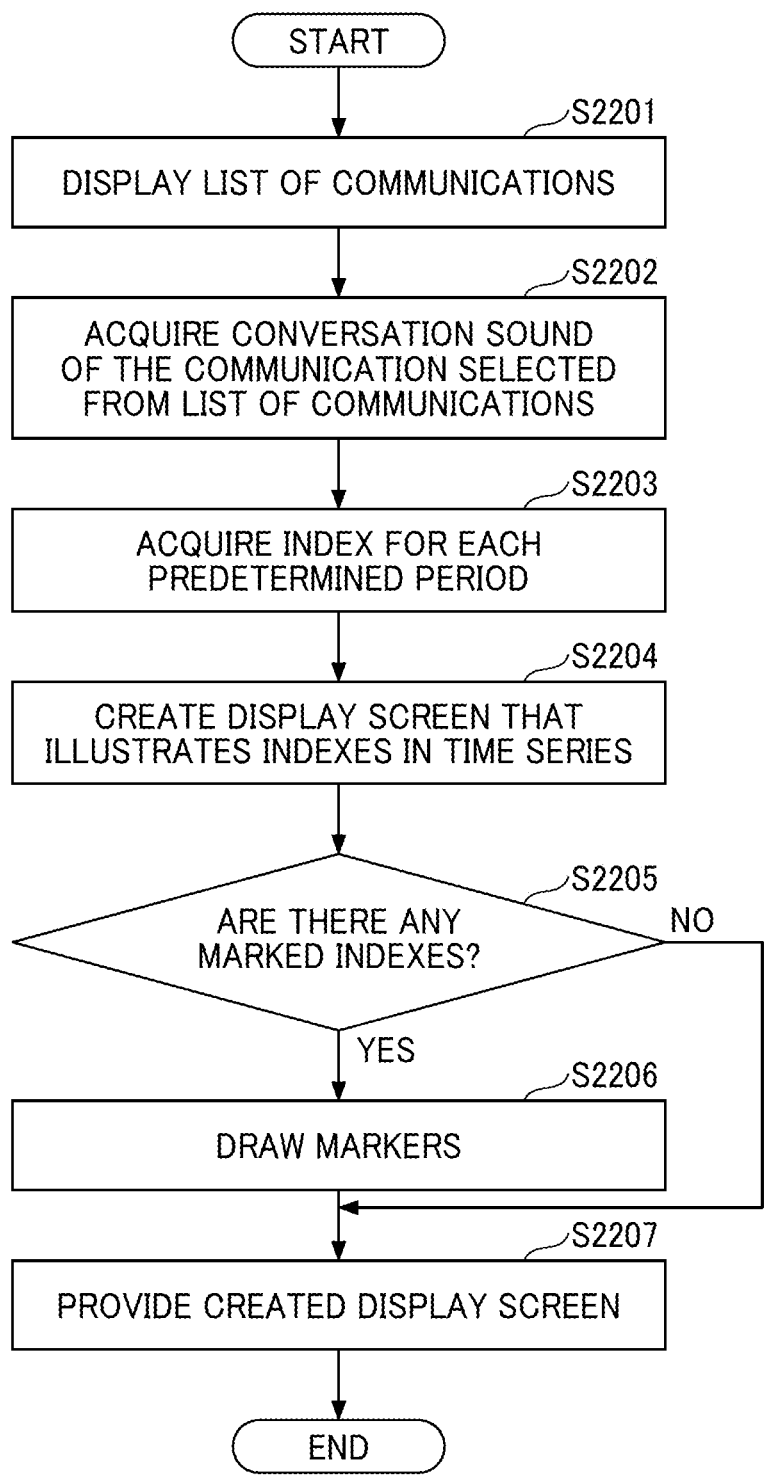
FIG. 22 is a flowchart of display screen providing processing according to the third embodiment of the present disclosure.

FIG. 22 is a flowchart of display screen providing processing according to the third embodiment of the present disclosure. In the following, a description is provided on the assumption that a participant participating in communication such as a game in the metaverse displays a display screen provided by the communication support apparatus 20 using the manager terminal device 101. Detailed descriptions of the same or substantially the same processes as the display screen providing processing according to the first embodiment described with reference to FIG. 11 are omitted below.

In step S2201, the information providing unit 1816 displays a list of communications in a selectable manner on a display unit such as the display 506 of the manager terminal device 101.

In step S2202, the information providing unit 1816 acquires the conversation sound of the communication selected from the list of communications from the storage unit 1818.

In step S2203, the information providing unit 1816 acquires the indexes for each predetermined period of the communication selected from the list of communications. For example, the information providing unit 1816 acquires the indexes stored in the storage unit 1818 at predetermined time intervals in step S2106 of FIG. 21.

In step S2204, the information providing unit 1816 creates a display screen in which the acquired indexes for each predetermined period are illustrated in time series. For example, the information providing unit 1816 creates a display screen 2300 including a sound volume timeline 2310 as illustrated in FIG. 23.

In steps S2205 and S2206, the information providing unit 1816 determines whether any marked indexes are present. When the marked indexes are present (YES in step S2205), the information providing unit 1816 displays the markers on the display screen created in step S2204.

In step S2207, the information providing unit 1816 provides the created display screen. For example, the information providing unit 1816 transmits the display screen 2300 as illustrated in FIG. 23 to the manager terminal device 101. As a result, the manager terminal device 101 displays the provided display screen.

Figure 23:
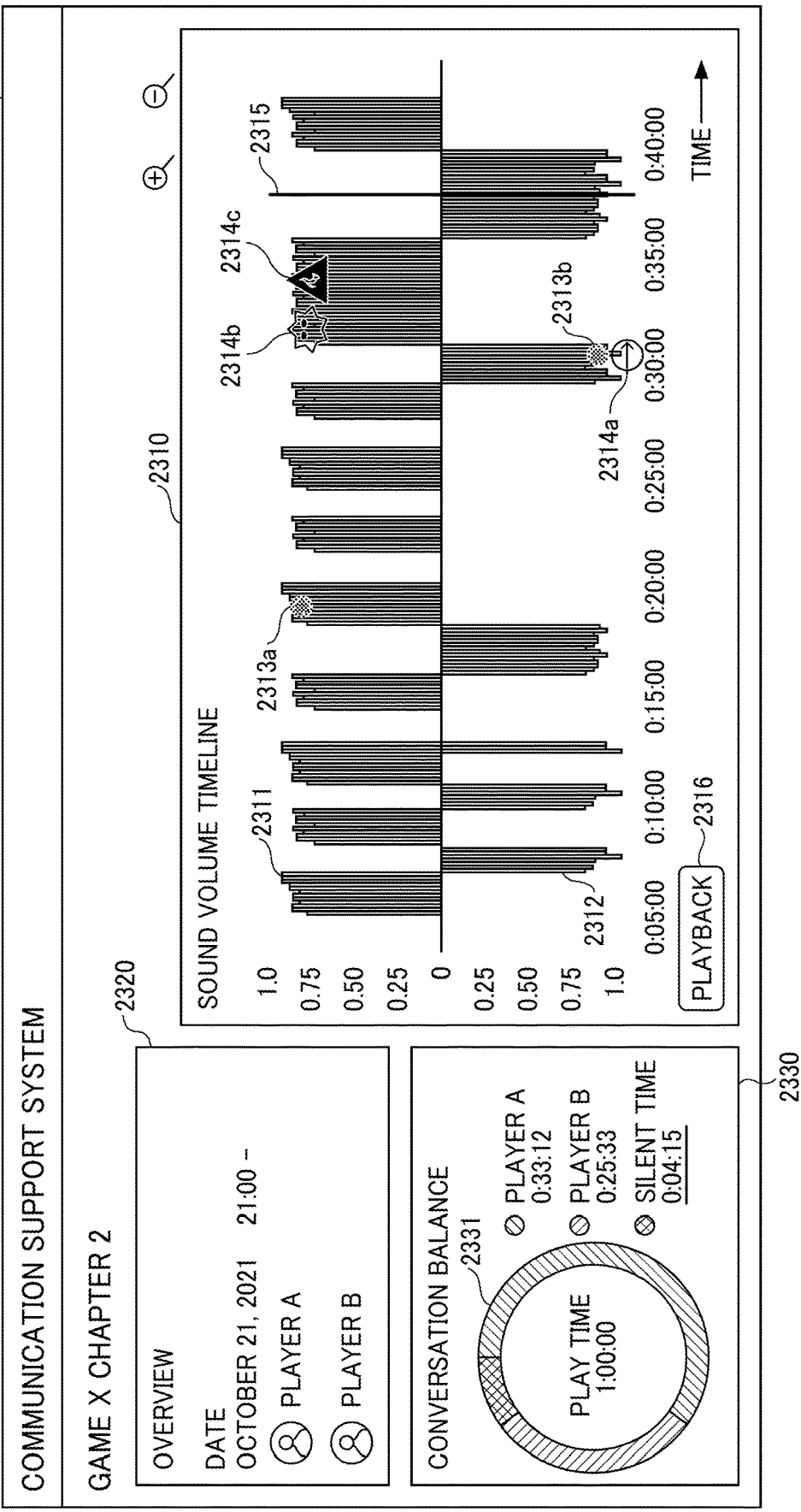
FIG. 23 is a diagram illustrating a display screen according to the third embodiment of the present disclosure.

Through the processing of FIG. 22, the communication support system 1 can display, for example, the display screen 2300 as illustrated in FIG. 23 on the manager terminal device 101.

FIG. 23 is a diagram illustrating the display screen 2300 according to the third embodiment of the present disclosure. In FIG. 23, an overview 2320, a conversation balance 2330, and a sound volume timeline 2310 are displayed on the display screen 2300 provided by the communication support system 1.

In the overview 2320, the date and time when participants participated in a game (an example of communication) in the metaverse, a player name (player A) of the participant, and a player name (player B) of another participant are displayed.

In the conversation balance 2330, a time during which the participant (player A) has spoken, a time during which another participant (player B) has spoken, and a silent period during which the participant and another participant have not spoken are displayed in the game in the metaverse.

In the sound volume timeline 2310, a speech sound volume 2311 of the participant (player A) and a speech sound volume 2312 of another participant (player B) are illustrated in time series with the horizontal axis representing time. The time on the horizontal axis is an example of the degree of progress of communication.

For example, the communication support system 1 displays markers 2313*a* and 2313*b* at positions where the speech sound volume is large from the speech sound volume 2311 of the participant or the speech sound volume 2312 of another participant displayed in time series.

In addition, the communication support system 1 displays markers 2314*a*, 2314*b*, and 2314*c* corresponding to predetermined keywords such as "right," "monster," and "flame magic" respectively at times when the keywords are detected in the game in the metaverse. As a result, the participants can easily grasp the portion where the predetermined keyword is spoken from the sound volume timeline 2310.

The communication support system 1 further has a function of outputting speech content of the selected portion from the speech sound volume 2311 of the participant or the speech sound volume 2312 of another participant displayed in time series. For example, the participant can move a bar 2315 indicating the playback position of the speech sound to around the marker 2314*b* and select a playback button 2316 to play back the speech sound of the selected portion (the portion where the predetermined keyword is spoken). The communication support system 1 may display character strings obtained by converting the speech sound of the selected portion into text data instead of playing back the speech sound of the selected portion.

As described above, the communication support system 1 according to the third embodiment can effectively record communication in the metaverse and easily review the information to be used later. In addition, the communication support system 1 according to the third embodiment can enhance the quality of communication and the efficiency of recording in an environment where a game play or a collaborative work is performed.

Fourth Embodiment

Figure 24:
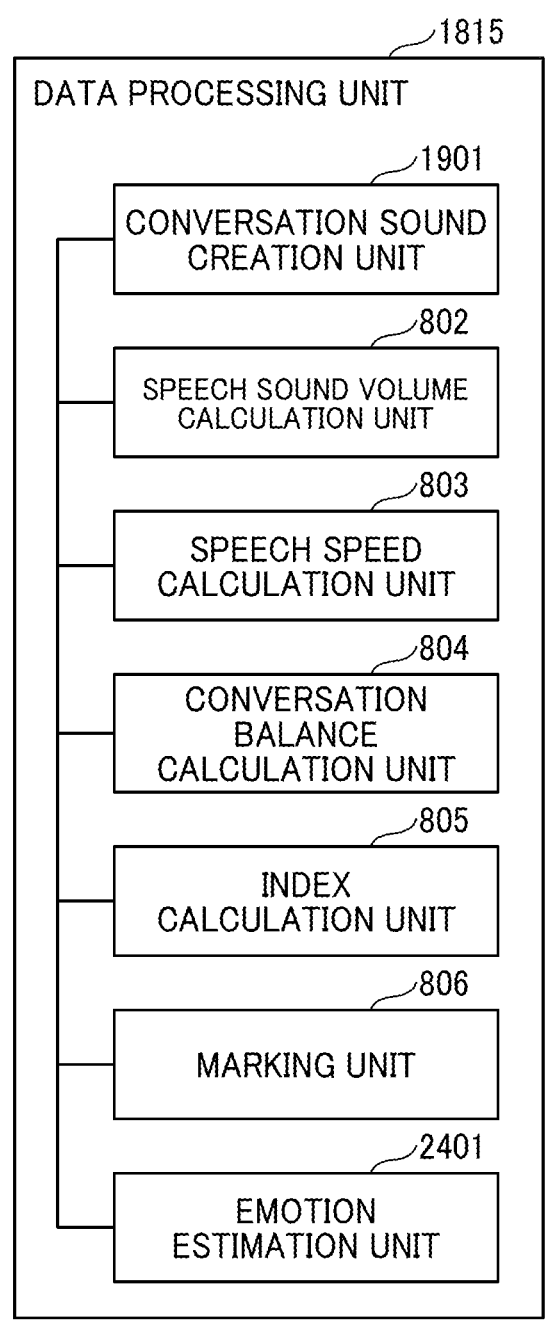
FIG. 24 is a diagram illustrating a functional configuration of a data processing unit according to a fourth embodiment of the present disclosure.

FIG. 24 is a diagram illustrating a functional configuration of a data processing unit according to a fourth embodiment of the present disclosure. The functional configuration of the communication support apparatus 20 is the same or substantially the same as that of the communication support apparatus 20 according to the third embodiment described with reference to FIG. 18.

As illustrated in FIG. 24, a data processing unit 1815 according to the fourth embodiment includes an emotion estimation unit 2401 instead of (or in addition to) the keyword extraction unit 1902 included in the data processing unit 1815 according to the third embodiment described with reference to FIG. 19.

The emotion estimation unit 2401 estimates the emotion of a speaker from the speech sound of the participant or the speech sound of another participant. For example, the emotion estimation unit 2401 uses any known artificial intelligence (AI) for emotion estimation to estimate an emotion such as whether the speaker is excited, tense, or sad from the speech sound. The emotion estimation unit 2401 may estimate the emotion of the speaker from the speech sound using, for example, an external cloud service (emotion estimation service).

Figure 25:
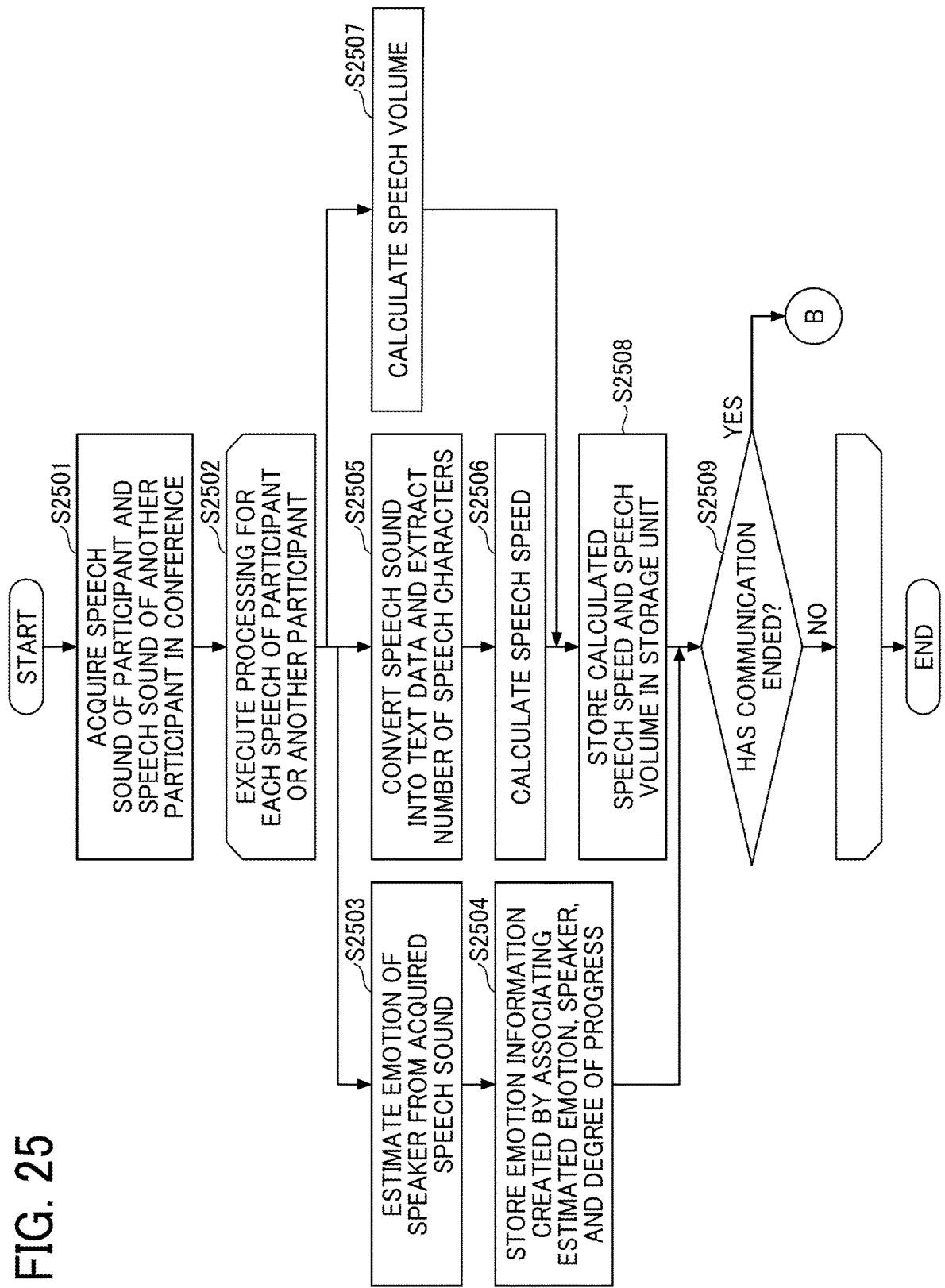
FIG. 25 is a flowchart of data processing according to the fourth embodiment of the present disclosure.

FIG. 25 is a flowchart of data processing according to the fourth embodiment of the present disclosure. The data processing illustrated in FIG. 25 is executed by the communication support system 1 when, for example, a participant who uses the terminal device 1600*a* and another participant who uses the terminal device 1600*b* play a game using the metaverse server 1610. For example, the communication support system 1 executes the processing of steps S2501 to S2509 of FIG. 25 during the game play and executes the processing of FIG. 21 after the end of the game play. Detailed descriptions of the same or substantially the same data processing according to the first and third embodiments are omitted below.

In step S2501, the acquisition unit 1814 acquires the speech sound of the participant playing the game in the metaverse and the speech sound of another participant.

In step S2502, the data processing unit 1815 repeatedly executes the processing of steps S2503 to S2509 for each speech of the participant or another participant.

In step S2503, the emotion estimation unit 2401 estimates the emotion of the speaker from the acquired speech sound. In step S2504, the emotion estimation unit 2401 associates the estimated emotion, the speaker, and the degree of progress to create emotion information, and stores the emotion information in the storage unit 1818.

The speech speed calculation unit 803 executes the processing of steps S2505 and S2506 in parallel with the processing of steps S2503 and S2504. In step S2505, the speech speed calculation unit 803 converts the acquired speech sound into text data and extracts the number of speech characters from the speech sound converted into text data. In step S2506, the speech speed calculation unit 803 calculates a speech speed (divide the number of speech characters by speech time) using the extracted number of speech characters.

In step S2507, the speech sound volume calculation unit 802 calculates the speech sound volume from the acquired speech sound in parallel with the processing in steps S2503 to S2506.

In step S2508, the data processing unit 1815 stores the calculated speech speed and speech sound volume in the storage unit 1818 for each speech.

In step S2509, the data processing unit 1815 determines whether the communication (e.g., game play) has ended. When the data processing unit 1815 determines that the communication has ended (YES in step S2509), the data processing unit 1815 proceeds the processing to step S2101 in FIG. 21. On the other hand, when the data processing unit 1815 determines that the communication has not ended (NO in step S2509), the data processing unit 1815 repeatedly executes the processing of steps S2503 to S2509 for each speech.

Through the processing of FIG. 25, the communication support system 1 can store the emotion information indicating the emotion of the participant or another participant according to the degree of progress of the communication in the storage unit 1818.

Figure 26:
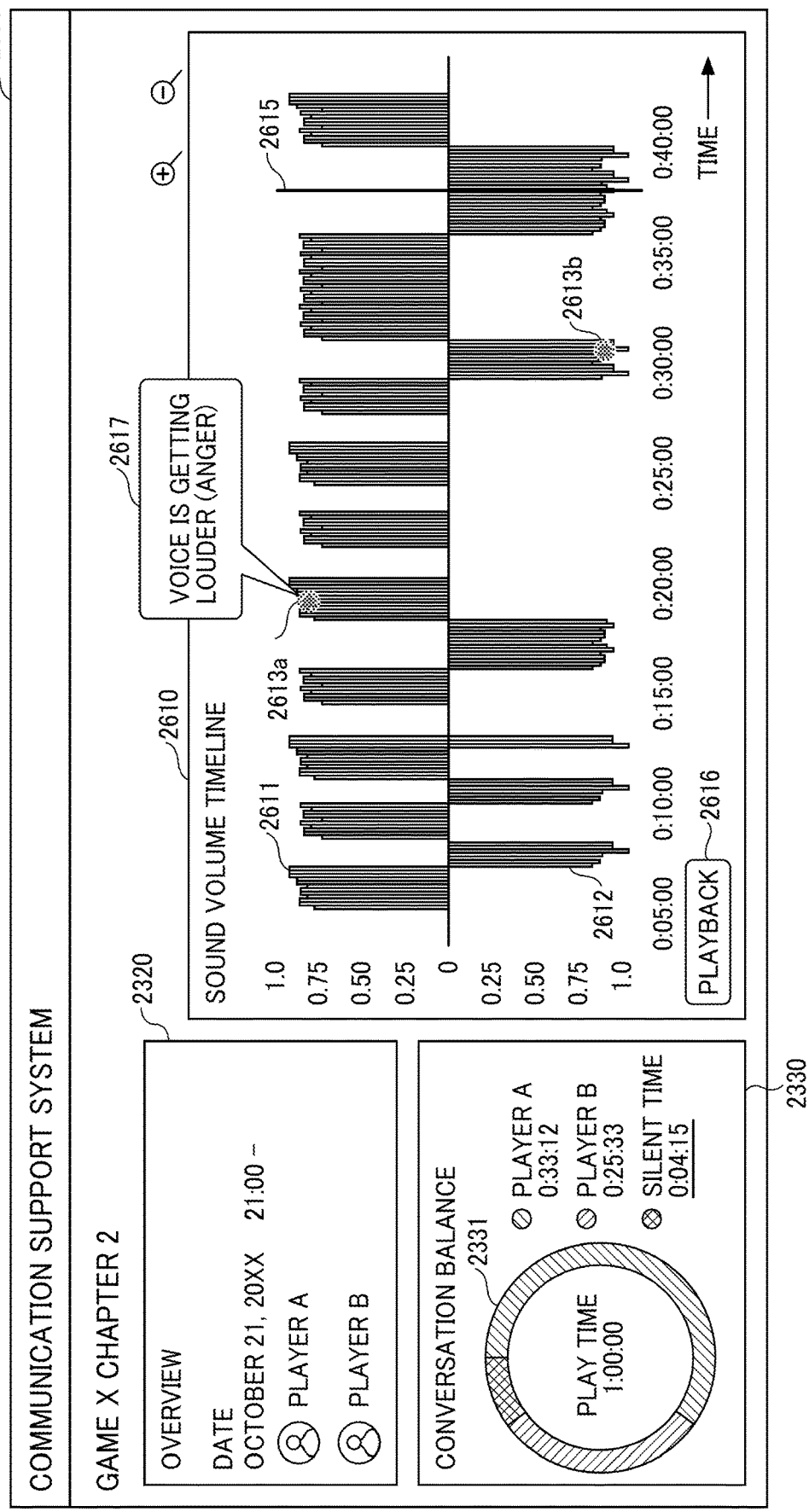
FIG. 26 is a diagram illustrating a display screen according to the fourth embodiment of the present disclosure.

FIG. 26 is a diagram illustrating a display screen according to the fourth embodiment of the present disclosure. In FIG. 26, similarly to the display screen 2300 according to the third embodiment described with reference to FIG. 23, the overview 2320 and the conversation balance 2330 are displayed on a display screen 2600 provided by the communication support system 1. A sound volume timeline 2610 is displayed on the display screen 2600.

In the sound volume timeline 2610, a speech sound volume 2611 of a participant (player A) and a speech sound volume 2612 of another participant (player B) are illustrated in time series with the horizontal axis representing time. The time on the horizontal axis is an example of the degree of progress of communication. In the sound volume timeline 2610, markers 2613a and 2613b are displayed at positions where the speech sound volume is large from the speech sound volume 2611 of the participant or the speech sound volume 2612 of another participant displayed in time series.

The communication support system 1 has the function of outputting speech content of a selected portion from the speech sound volume 2611 of the participant or the speech sound volume 2612 of another participant displayed in time series. For example, the participant can move the bar 2615 indicating the playback position of the speech sound to around the marker 2613a and select a playback button 2616 to play back the speech sound at the selected portion. The communication support system 1 may display character strings obtained by converting the speech sound of the selected portion into text data instead of playing back the speech sound of the selected portion.

When a cursor such as a mouse pointer is brought close to the markers 2613a and 2613b, the communication support system 1 can display a comment 2617 indicating the reason why the markers 2613a and 2613b are displayed, and the emotion of the speaker.

In the fourth embodiment, for example, the markers 2314a, 2314b, and 2314c corresponding to predetermined keywords as illustrated in FIG. 23 can be displayed on the sound volume timeline 2610 in combination with the third embodiment. In this case, for example, when a cursor such as a mouse pointer is brought close to the markers 2314a, 2314b, and 2314c, the communication support system 1 can display a comment indicating the emotion of the speaker when the predetermined keyword is spoken.

As described above, the communication support system 1 according to the fourth embodiment can store and output information on the emotions of the participant or another participant participating in the communication, in association with the communication.

The display screen 2600 illustrated in FIG. 26 is an example. For example, the communication support system 1 may display an emotion timeline indicating a change in emotion such as anger or sadness on the display screen 2600 based on the information stored in step S2504 of FIG. 25 instead of (or in addition to) the sound volume timeline 2610. The communication support system 1 may display an emotional balance indicating a balance of emotions such as anger or sadness on the display screen 2600 instead of (or in addition to) the conversation balance 2330.

The horizontal axis of the sound volume timeline 2610 is "time" in FIG. 26. However, the horizontal axis of the sound volume timeline 2610 (or the emotion timeline) may be, for example, a chapter indicating the degree of progress of the game, or information indicating a place in the game.

As described above, according to the embodiments of the present disclosure, a communication support system that facilitates confirming the content of communication later can be provided.

Each of the functions of the described embodiments can be implemented by one or more processing circuits or circuitry. In the embodiments of the present disclosure, the processing circuit includes a processor programmed to execute each of the functions by software such as a processor implemented by an electronic circuit, and a device such as an application specific integrated circuit (ASIC), a digital signal processor (DSP), a field programmable gate array (FPGA), or a circuit module designed to execute each function described above.

The group of apparatuses or devices described in the above-described embodiments are merely one example of multiple types of computing environments that implement the embodiments of the present disclosure. In some embodiments, the conference server 10 and the communication support apparatus 20 include multiple computing devices, such as a server cluster. The multiple computing devices are configured to communicate with one another through any type of communication link, including a network, a shared memory, etc., and perform the processes disclosed herein.

Further, the conference server 10, the communication support apparatus 20, and the manager terminal device 101 can be configured to share the disclosed processing steps, for example, the processing illustrated in FIGS. 9 to 11, 13, and 14 in various combinations. For example, the process executed by the conference server 10 may be executed by the communication support apparatus 20 or the manager terminal device 101. The conference server 10 may be integrated into one server or may be divided into multiple servers.

A description is given below of some aspects of the present disclosure.

In this specification, a communication support system, a communication support apparatus, a communication support method, and a storage medium according to several examples are disclosed.

Aspect 1

A communication support system includes an acquisition unit, an information providing unit, and an output unit. The acquisition unit acquires a speech sound of a participant participating in a communication and a speech sound of another participant participating in the communication. The information providing unit provides a display screen in which an index indicating a speech state of the participant and an index indicating a speech state of another participant are illustrated in time series. The output unit outputs speech content of a selected portion from the index indicating the speech state of the participant or the index indicating the speech state of another participant illustrated on the display screen.

Aspect 2

In the communication support system according to Aspect 1, the output unit plays back the speech sound of the selected portion.

Aspect 3

In the communication support system according to Aspect 1 or Aspect 2, the output unit displays character strings obtained by converting the speech sound of the selected portion into text data.

Aspect 4

In the communication support system according to any one of Aspects 1 to 3, the information providing unit displays a predetermined display element at a position where the index indicating the speech state of the participant or the index indicating the speech state of another participant satisfies a predetermined condition on the display screen.

Aspect 5

In the communication support system according to any one of Aspects 1 to 3, the information providing unit illustrates a speech sound volume of the participant and a speech sound volume of another participant in time series on the display screen. The information providing unit displays a display element indicating at which the speech sound volume exceeds a first threshold value on the display screen.

Aspect 6

In the communication support system according to any one of Aspects 1 to 3, the information providing unit illustrates a conversation density of the participant and a conversation density of another participant in time series on the display screen. The information providing unit displays a display element indicating at which the conversation density exceeds a second threshold value on the display screen.

Aspect 7

In the communication support system according to Aspect 6, the information providing unit calculates a conversation density of the participant based on the number of speech characters of the participant within a predetermined period and calculates a conversation density of another participant based on the number of speech characters of another participant within the predetermined period.

Aspect 8

In the communication support system according to any one of Aspects 4 to 7, the information providing unit displays a reason why the display element is illustrated on the display screen.

Aspect 9

In the communication support system according to any one of Aspects 1 to 8, the information providing unit illustrates a conversation balance between the participant and another participant on the display screen. When the conversation balance includes a problem, the information providing unit displays that the conversation balance includes the problem on the display screen.

Aspect 10

In the communication support system according to any one of Aspects 1 to 9, the information providing unit illustrates a display element indicating a portion at which the participant or another participant has spoken a predetermined keyword on the display screen.

Aspect 11

In the communication support system according to Aspect 10, the information providing unit displays the display element in association with a speaker who has spoken the predetermined keyword or a degree of progress of the communication when the predetermined keyword is spoken.

Aspect 12

The communication support system according to any one of Aspects 1 to 11 further includes an emotion estimation unit. The emotion estimation unit estimates an emotion of the participant or another participant based on the speech sound acquired by the acquisition unit. The information providing unit displays a display element indicating the emotion estimated by the emotion estimation unit on the display screen.

Aspect 13

A communication support apparatus includes an acquisition unit, an information providing unit, and an output unit. The acquisition unit acquires a speech sound of a participant participating in a communication and a speech sound of another participant participating in the communication. The information providing unit provides a display screen in which an index indicating a speech state of the participant and an index indicating a speech state of another participant are illustrated in time series. The output unit outputs speech content of a selected portion from the index indicating the speech state of the participant or the index indicating the speech state of another participant illustrated on the display screen.

Aspect 14

A communication support method is performed by a computer. The communication support method includes: acquiring a speech sound of a participant participating in a communication and a speech sound of another participant participating in the communication; providing a display screen in which an index indicating a speech state of the participant and an index indicating a speech state of another participant are illustrated in time series; and outputting speech content of a selected portion from the index indicating the speech state of the participant or the index indicating the speech state of another participant illustrated on the display screen.

Aspect 15

A program is performed by a computer. The program causes the computer to execute the communication support method according to Aspect 14.

The above-described embodiments are illustrative and do not limit the present invention. Thus, numerous additional modifications and variations are possible in light of the above teachings. For example, elements and/or features of different illustrative embodiments may be combined with each other and/or substituted for each other within the scope of the present invention. Any one of the above-described operations may be performed in various other ways, for example, in an order different from the one described above.

The above-described embodiments are illustrative and do not limit the present invention. Thus, numerous additional modifications and variations are possible in light of the above teachings. For example, elements and/or features of different illustrative embodiments may be combined with each other and/or substituted for each other within the scope of the present invention. Any one of the above-described operations may be performed in various other ways, for example, in an order different from the one described above.

The functionality of the elements disclosed herein may be implemented using circuitry or processing circuitry which includes general purpose processors, special purpose processors, integrated circuits, application specific integrated circuits (ASICs), digital signal processors (DSPs), field programmable gate arrays (FPGAs), conventional circuitry and/or combinations thereof which are configured or programmed to perform the disclosed functionality. Processors are considered processing circuitry or circuitry as they include transistors and other circuitry therein. In the disclosure, the circuitry, units, or means are hardware that carry out or are programmed to perform the recited functionality. The hardware may be any hardware disclosed herein or otherwise known which is programmed or configured to carry out the recited functionality. When the hardware is a processor which may be considered a type of circuitry, the circuitry, means, or units are a combination of hardware and software, the software being used to configure the hardware and/or processor.

The invention claimed is:

1. A communication support system comprising:
processing circuitry configured to:
   acquire a speech sound of a participant participating or having participated in a communication and a speech sound of the other participant participating or having participated in the communication;
   display, on a display screen, an index indicating a speech state of the participant and an index indicating a speech state of the other participant in time series; and
   output speech content of a selected portion of the index indicating the speech state of the participant or the index indicating the speech state of the other participant, wherein
   the index indicating the speech state of the participant is a conversation density of the participant and the index indicating the speech state of the other participant is a conversation density of the other participant, and
   the processing circuitry is configured to display a display element indicating at which the conversation density exceeds a conversation density threshold value on the display screen.

2. The communication support system according to claim 1, wherein the processing circuitry is configured to play back the speech sound of the selected portion.

3. The communication support system according to claim 1, wherein the processing circuitry is configured to display character strings of text data converted from the speech sound of the selected portion.

4. The communication support system according to claim 1, wherein the processing circuitry is configured to display, on the display screen, a display element at a position where the index indicating the speech state of the participant or the index indicating the speech state of the other participant satisfies a predetermined condition.

5. The communication support system according to claim 1,
wherein the index indicating the speech state of the participant is a speech sound volume of the participant and the index indicating the speech state of the other participant is a speech sound volume of the other participant, and
wherein the processing circuitry is configured to display a display element indicating at which the speech sound volume exceeds a speech sound volume threshold value on the display screen.

6. The communication support system according to claim 1,
wherein the processing circuitry is configured to calculate the conversation density of the participant based on a number of speech characters of the participant within a predetermined period, and
wherein the processing circuitry is configured to calculate the conversation density of the other participant based on the number of speech characters of the other participant within the predetermined period.

7. The communication support system according to claim 4,
wherein the processing circuitry is configured to display a reason why the display element is displayed on the display screen.

8. The communication support system according to claim 1,
wherein the processing circuitry is configured to display, on the display screen, a conversation balance between the participant and the other participant, and
in a case that a problem exists with the conversation balance, the processing circuitry is configured to display that a problem exists with the conversation balance.

9. The communication support system according to claim 1,
wherein the processing circuitry is configured to display, on the display screen, a display element indicating a portion at which the participant or the other participant has spoken a predetermined keyword.

10. The communication support system according to claim 9, wherein the processing circuitry is configured to display the display element in association with a speaker who has spoken the predetermined keyword or a degree of progress of the communication when the predetermined keyword is spoken.

11. The communication support system according to claim 1, wherein the processing circuitry is further configured to
estimate an emotion of the participant or the other participant based on the speech sound that is acquired, and
display, on the display screen, a display element indicating the emotion that is estimated.

12. A communication support apparatus comprising:
processing circuitry configured to:
   acquire a speech sound of a participant participating or having participated in a communication and a speech sound of the other participant participating or having participated in the communication;
   display, on a display screen, an index indicating a speech state of the participant and an index indicating a speech state of the other participant in time series; and
   output speech content of a selected portion of the index indicating the speech state of the participant or the index indicating the speech state of the other participant, wherein
   the index indicating the speech state of the participant is a conversation density of the participant and the index indicating the speech state of the other participant is a conversation density of the other participant, and the processing circuitry is configured to display a display element indicating at which the conversation density exceeds a conversation density threshold value on the display screen.

13. A communication support method, the method comprising:

acquiring a speech sound of a participant participating or having participated in a communication and a speech sound of the other participant participating or having participated in the communication;

displaying, on a display screen, an index indicating a speech state of the participant and an index indicating a speech state of the other participant in time series; and outputting speech content of a selected portion of the index indicating the speech state of the participant or the index indicating the speech state of the other participant, wherein the index indicating the speech state of the participant is a conversation density of the participant and the index indicating the speech state of the other participant is a conversation density of the other participant, and the displaying includes displaying a display element indicating at which the conversation density exceeds a conversation density threshold value on the display screen.

14. A non-transitory, computer-readable storage medium storing computer-readable program code that causes a computer to perform the communication support method of claim 13.

* * * * *